(12) United States Patent
Ramnani

(10) Patent No.: US 8,825,784 B2
(45) Date of Patent: Sep. 2, 2014

(54) AUTOMATIC PROFILE UPDATE IN A MOBILE DEVICE

(71) Applicant: Manoj Ramnani, Vienna, VA (US)

(72) Inventor: Manoj Ramnani, Vienna, VA (US)

(*) Notice: Subject to any disclaimer, the term of this patent is extended or adjusted under 35 U.S.C. 154(b) by 0 days.

(21) Appl. No.: 13/939,315

(22) Filed: Jul. 11, 2013

(65) Prior Publication Data

US 2013/0303134 A1 Nov. 14, 2013

Related U.S. Application Data

(62) Division of application No. 12/737,410, filed as application No. PCT/US2009/004088 on Jul. 15, 2009, now Pat. No. 8,499,037.

(60) Provisional application No. 61/080,697, filed on Aug. 19, 2008.

(51) Int. Cl.
*G06F 15/16* (2006.01)
*H04W 4/16* (2009.01)
*G06Q 30/02* (2012.01)
*H04W 8/18* (2009.01)
*H04L 29/08* (2006.01)
*H04W 4/02* (2009.01)

(52) U.S. Cl.
CPC ............. *H04W 4/16* (2013.01); *H04L 67/306* (2013.01); *H04L 67/303* (2013.01); *G06Q 30/02* (2013.01); *H04W 8/18* (2013.01); *H04W 4/02* (2013.01)
USPC ........................................ 709/206

(58) Field of Classification Search
USPC ............................ 709/201, 203–206, 217–219
See application file for complete search history.

(56) References Cited

U.S. PATENT DOCUMENTS

| 7,373,139 | B2* | 5/2008 | Suzuki ........................ 455/414.2 |
| 8,296,351 | B2* | 10/2012 | Lazaridis et al. ............. 709/201 |
| 2002/0138625 | A1* | 9/2002 | Bruner et al. ................. 709/227 |
| 2003/0069746 | A1* | 4/2003 | Kuramatsu ........................ 705/1 |

* cited by examiner

*Primary Examiner* — Brendan Higa
(74) *Attorney, Agent, or Firm* — Attentive Law; Paul Ratcliffe

(57) ABSTRACT

A method and system for managing mobile exchange of profile information between a requestor and a recipient. A mobile client is provided on a requestor's first mobile device. The requestor provides requestor profile to an information exchange server through the mobile client. The requestor requests for a connection with the recipient using the mobile client. The mobile client is provided on a recipient's second mobile device. The recipient provides recipient profile to the information exchange server through the mobile client. On acceptance of the request for connection by the recipient, the information exchange server transfers the recipient profile to the mobile client on the requestor's first mobile device and vice versa. The mobile client automatically updates the transferred recipient profile on the requestor's first mobile device based on changes made by the recipient to the recipient profile and vice versa.

28 Claims, 20 Drawing Sheets

AUTOMATIC PROFILE UPDATE IN A MOBILE DEVICE

CROSS REFERENCE TO RELATED APPLICATION

This application claims the benefit of U.S. patent application Ser. No. 12/737,410, entitled "AUTOMATIC PROFILE UPDATE IN A MOBILE DEVICE" filed Jan. 11, 2011 which is the national application of PCT application PCT/US2009/004088 filed Jul. 15, 2009 which claims priority to U.S. Provisional application No. 61/080,697 filed Jul. 15, 2008, the entirety of both of which are incorporated herein.

BACKGROUND OF THE INVENTION

1. Field of the Invention

The invention, in general, relates to electronic business cards. More particularly, this invention relates to a method of exchanging electronic business cards through mobile phones between a user and contacts of the user. The contacts of the user may comprise personal and business contacts of the user.

2. Description of the Related Art

Electronically cataloging traditional business cards may be time consuming and prone to error. Business card information logged into an electronic contact management system may become obsolete over a period of time. The user may run out of the traditional business cards for exchange with the user's business contacts. The user may need to track relationship context along with the business card information of the user's business contacts to make note of context information such as place, time, relationship with a particular business contact, etc. The user may also need to send updates to the business card information of the user to user's business contacts in real time. The updates to the user's business card information may comprise a change in job profile, address, phone number or email address of the user. The user may also need to stay updated on the latest business card information of the user's business contacts at all times.

The user may also lose electronic business cards received from user's business contacts due to loss, malfunction, or replacement of the user's mobile device. Therefore, for an instance of loss of the electronic business cards, the user may need a backup of the electronic business cards of the user's personal and business contacts to retrieve the electronic business cards back on the mobile device of the user. The user may also want to send updated contact information to new business contacts through the user's mobile device automatically without user intervention. Existing online service providers' provide communication means to exchange business card information through web sites and electronic mails (emails), and business card scans stored on computer. The communication means provided by the existing online service providers may not capture the context of the exchange, for example, time and date of exchange, user notes, location, etc., nor may it capture social media information (e.g. blogs, LinkedIn, Facebook, or Twitter information). However, means to exchange the business card information instantly using mobile phones may not be provided by the online service providers.

Therefore, there is need for a method and a system that enables the user to exchange electronic business cards instantly through the user's mobile phone, share business card information (including social media information and context) with the user's business contacts, and capture context of meetings with the business contacts. There is also a need for the method and the system for storing the electronic business cards of the user's business contacts on a central server as a backup means. There is also a need for the method and the system to automatically update modified business card information of the user's business contacts on the user's mobile device and vice versa.

SUMMARY OF THE INVENTION

This summary is provided to introduce a selection of concepts in a simplified form that are further described in the detailed description of the invention. This summary is not intended to identify key or essential inventive concepts of the claimed subject matter, nor is it intended for determining the scope of the claimed subject matter.

The method and system disclosed herein provides a mobile client on a requestor's first mobile device. The requestor provides requestor profile to an information exchange server through the mobile client. The requestor requests a connection with the recipient using the mobile client. The mobile client is provided on a recipient's second mobile device. The recipient provides recipient profile to the information exchange server through the mobile client. On acceptance of the request for connection by the recipient, the information exchange server transfers the recipient profile to the mobile client on the requestor's first mobile device and vice versa. The mobile client automatically updates the transferred recipient profile on the requestor's first mobile device based on changes made by the recipient to the recipient profile and vice versa.

BRIEF DESCRIPTION OF THE DRAWINGS

The foregoing summary, as well as the following detailed description of the invention, is better understood when read in conjunction with the appended drawings. For the purpose of illustrating the invention, exemplary constructions of the invention are shown in the drawings. However, the invention is not limited to the specific methods and instrumentalities disclosed herein.

DETAILED DESCRIPTION OF EXEMPLARY EMBODIMENTS

Particular embodiments of the present invention will now be described in greater detail with reference to the figures.

Figure 1:
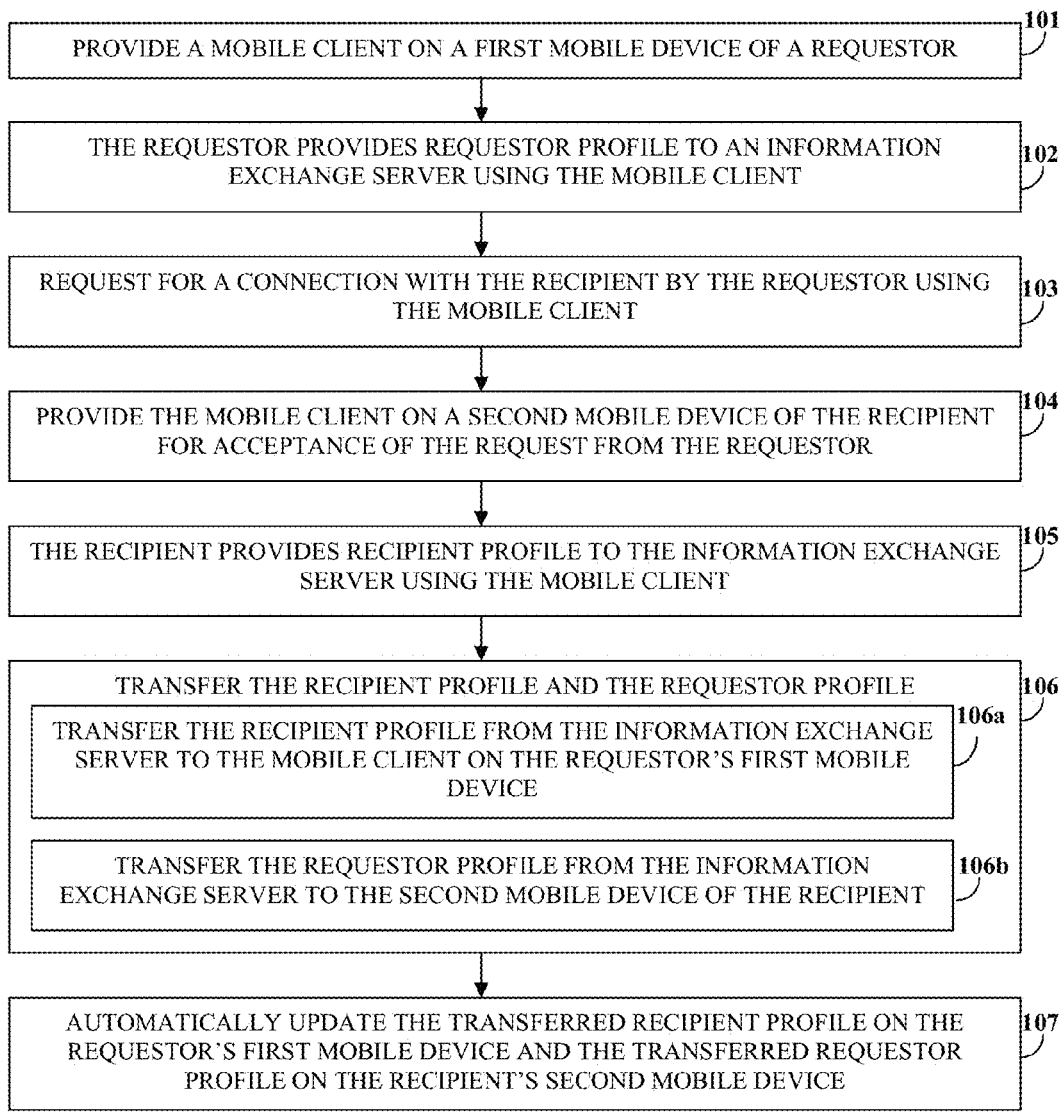
FIG. 1 illustrates a method of managing mobile exchange of profile information between a requestor and a recipient.
Figure 2:
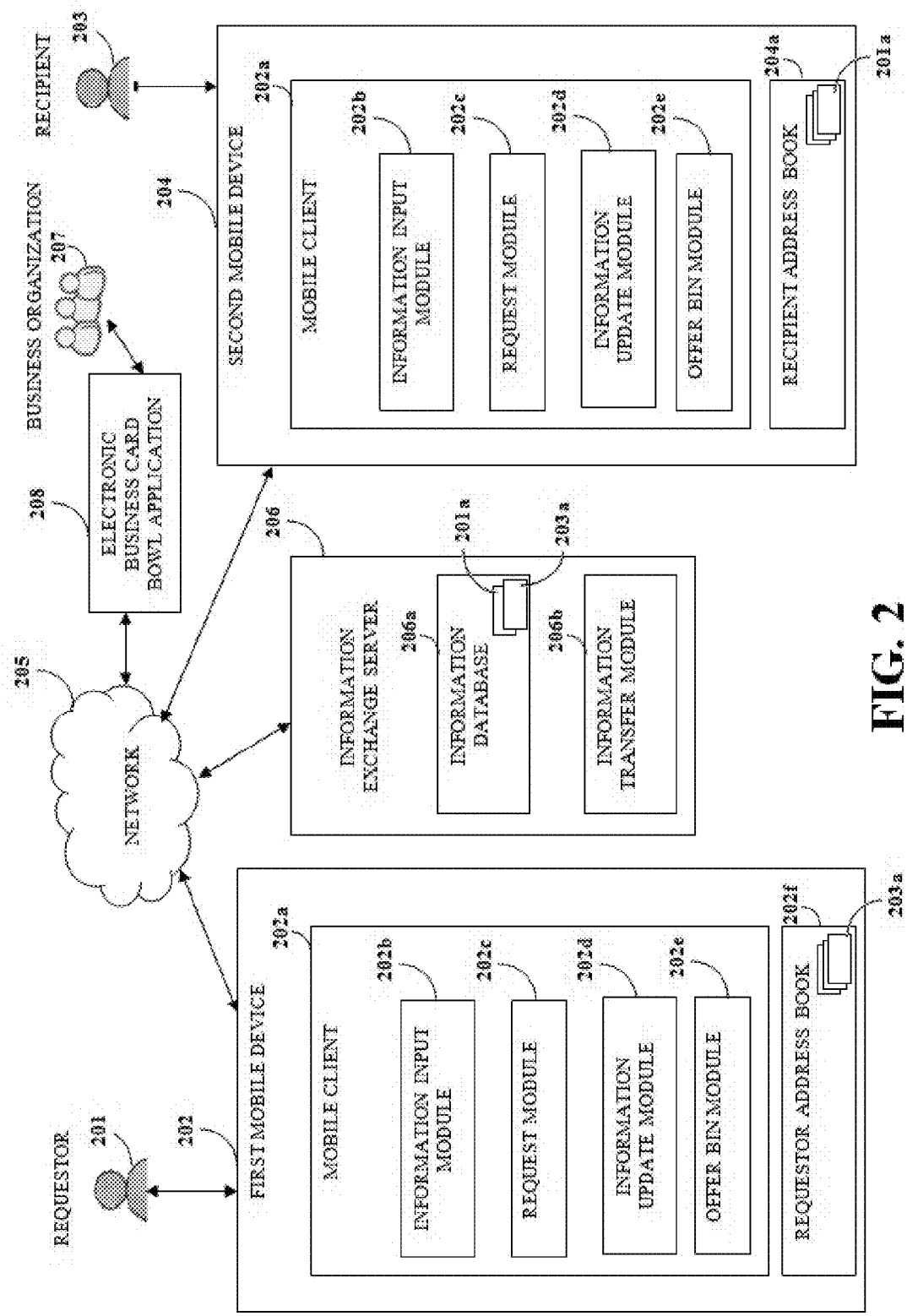
FIG. 2 illustrates a system of managing mobile exchange of profile information between a requestor and a recipient.

FIGS. 1-2 illustrate a method and system of managing mobile exchange of profile information between a requestor 201 and a recipient 203. The profile information may comprise user name, contact numbers, email addresses, visual images, audio content, job profile, location addresses, and social media information and links, etc of the requestor 201 and the recipient 203 respectively. An electronic business card on a mobile device may collectively represent the profile information on a mobile device of the requestor 201 and the recipient 203 respectively.

Although the description refers to the requestor 201 as the party asking for the recipient's 203 profile information, it is to be understood that the requestor 201 and the recipient 203 may change roles, such that the recipient 203 may be the one asking for the requestor's 201 profile information. However, for clarity and to avoid confusion, the description will refer to the requestor 201 as the one asking for profile information from at least one or more other recipients 203.

The method disclosed herein provides 101 a mobile client 202a on a first mobile device 202 of the requestor 201. The requestor 201 may download and install the mobile client 202a from a host website via a network 205 onto the first mobile device 202. The mobile client 202a is compatible for installation on mobile devices working on different technological platforms and operating systems, for example, Java, Symbian, Windows, Mac, iPhone, Linux, Unix, Palm, etc.

Figure 8A:
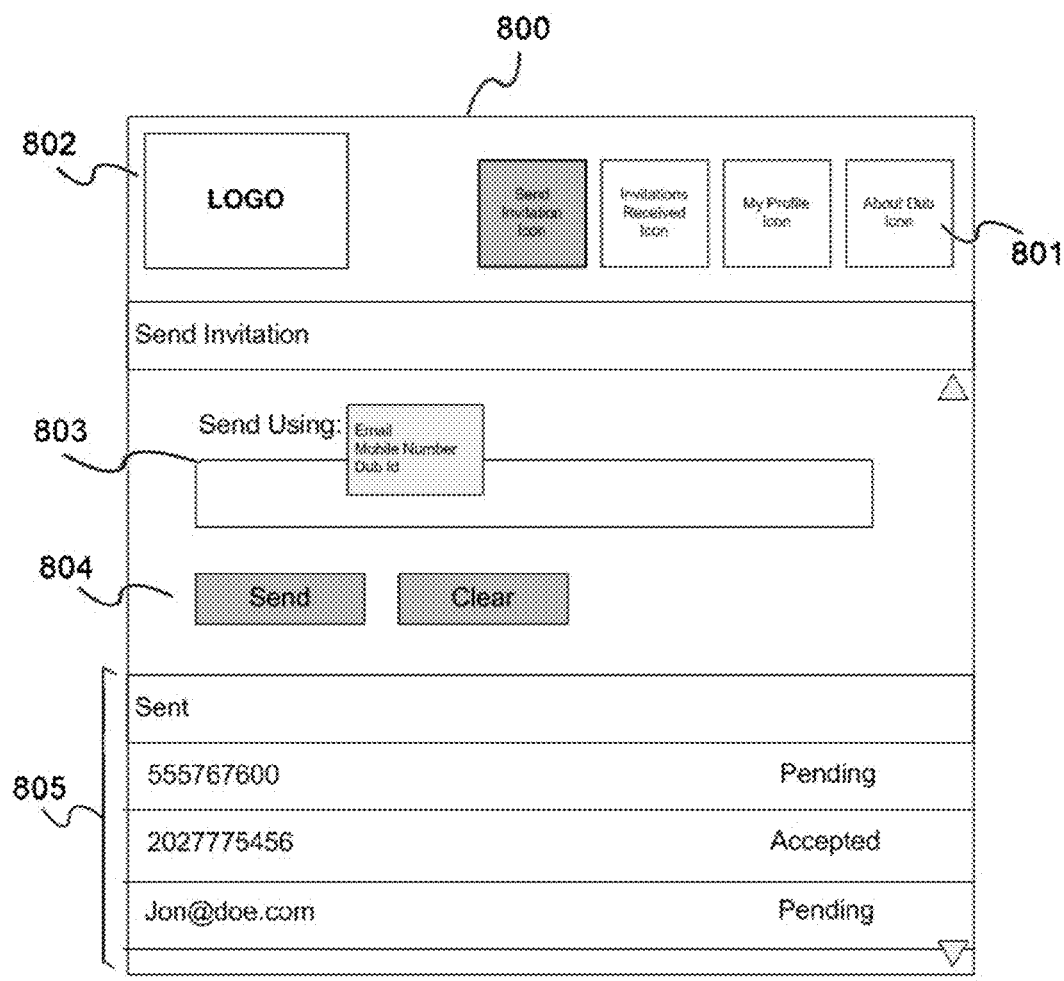
FIGS. 8A-8K exemplarily illustrate user actions performed by a user using a mobile client on a mobile device of the user.

The requestor 201 then provides 102 requestor profile 201a to an information exchange server 206 of the host website through the mobile client 202a via the network 205. The requestor 201 may also use browser based computing devices to provide the requestor profile 201a on the host website on the internet directly. The requestor 201 then requests 103 for a connection with the recipient 203 through the information exchange server 206 using the mobile client 202a as shown in the user interface 800 of FIG. 8A. At box 803, the requestor 201 may generate and send (at box 804) the request as a short message service (SMS), an electronic mail (email), or through push notification (if the recipient is registered in the system the requestor may use the user ID of the recipient 203 instead of the SMS or email) via the information exchange server 206 to a second mobile device 204 of the recipient 203 using the mobile client 202a as illustrated in FIG. 8A. The status of the various generated requests may be shown at box 805. Various types of information may be included in the user interface 800, such as active screen information (box 801), or logos and or other types of advertisement information (at boxes 802, 807).

The request may be described as an "identification code" or ID code that initiates a set of instructions to be performed and controlled by the information exchange server 206. Specifically, the identification code might contain an access code along with a key or hash function, a call to the specific API or API function, and/or any other type of required data to execute the appropriate function or functions. The function might consist of a profile transfer request to or from the recipient 203 or the requester 201, or any other function the user could perform through the mobile application. In one example, the access code and key may be a unique code and key which is established or loaded onto the mobile device 202, 204 when the user first registers, logs in, or uses the mobile client on the mobile device 202, 204. In such an embodiment, the mobile device may provide the access code and key, and/or associated data information, to all transmissions along with the API request and appropriate data to provide the identity of the device, the user, and the appropriate instructions. The access code and key might also be a user name and password which are passed to the information exchange server 206 along with the API or instruction request and related data.

The identification code may be associated with various types of information, including but not limited to an access code, a key, a hash function, an API request or call, data required to perform the API request, information about the mobile device, location based information, a user, a user's preferences, the mobile device capabilities, profile information of a user, a social or professional event, a group, a centralized group coordinator, and any other type of data in accordance with this invention.

Another important aspect about the present invention is the ability for the system to obtain, pull, or retrieve information about the mobile device used by the requestor 201 or the recipient 203. Such information might include the type of mobile device, platform and version, carrier information, profile information, and location based information. The system will know if a user changes mobile devices, the capabilities of the mobile device, if the user had updated software, or changes information about their mobile device. The profile and location data can be used to identify users about software upgrades, version conflicts, and location based services including internet access to GPS location of lost mobile devices.

In more detail, it is to be understood that various types of information may be made available to the information exchange server 206 during signaling in accordance with systems and methods of this invention, similar to the information exchanged when a mobile device registers (either as a push or a pull inquiry) with its serving network. At registration, and likewise when as here the mobile device signals into the network 208, information about the particular device being used, such as the location of the mobile device, the user's profile, user preferences, and the like, may be shared with the information exchange server 206. For various reasons, this information may be used by the information exchange server 206 to coordinate the type of messaging that should be prepared and sent to an intended mobile device recipient. For example, one user, and/or serving network for the mobile device of the user, may set a preference to receive SMS messages on his mobile device, while another user may prefer to receive email messages on their mobile device or at another device location. The information exchange server 206 is equipped to handle such translation and requests appropriately for the particular preference appropriately.

An "event" may be a one-to-one communication encounter, a one-to-many communication encounters, a social or personal meeting, and other engagement or environment in which contact profile information is generally exchanged amongst various people. Although the request is described above as a SMS or an email to communicate back to the information exchange server 206, it is to be understood that any type of push or messaging protocol may be employed, including but not limited to, MMS, USSD, a dedicated short code, and or any other suitable messaging protocol capable of sending a request. The requestor 201 may also use other communications means, for example, infrared data transfer, Bluetooth, WiFi or WiMax, etc, to send the request to the recipient's 203 second mobile device 204.

FIG. 8A depicts an exemplary user interface 800 on a first mobile device 202. The user interface 800 includes selectable profile indicators 801 and a space for a logo 802. As shown, the "Send Invitation Icon" is selected at 801. A data entry box 803 is provided to insert the email, mobile number, a user id, or a message, and/or other types of information, and action buttons 804 are provided to send or clear the message in the data entry box 803. Various status boxes 805, 801a are illustrated depicting the status of various invitations. The various FIGS. 8B-8K show similar user interfaces 800 including similar labels and indicia.

The information exchange server 206 then provides 104 the mobile client 202a on the recipient's 203 second mobile device 204 for acceptance of the request from the requestor 201. The information exchange server 206 may provide a hyperlink in an SMS or in an email sent by the requestor 201. The recipient 203 may click on the hyperlink in the SMS or the email for downloading the mobile client 202a on the recipient's 203 second mobile device 204. The recipient 203 may then download and configure the mobile client 202a on the recipient's 203 second mobile device 204. The recipient 203 then provides 105 the recipient profile 203a to the information exchange server 206 through the mobile client 202a on the recipient's 203 second mobile device 204.

Figure 8B:
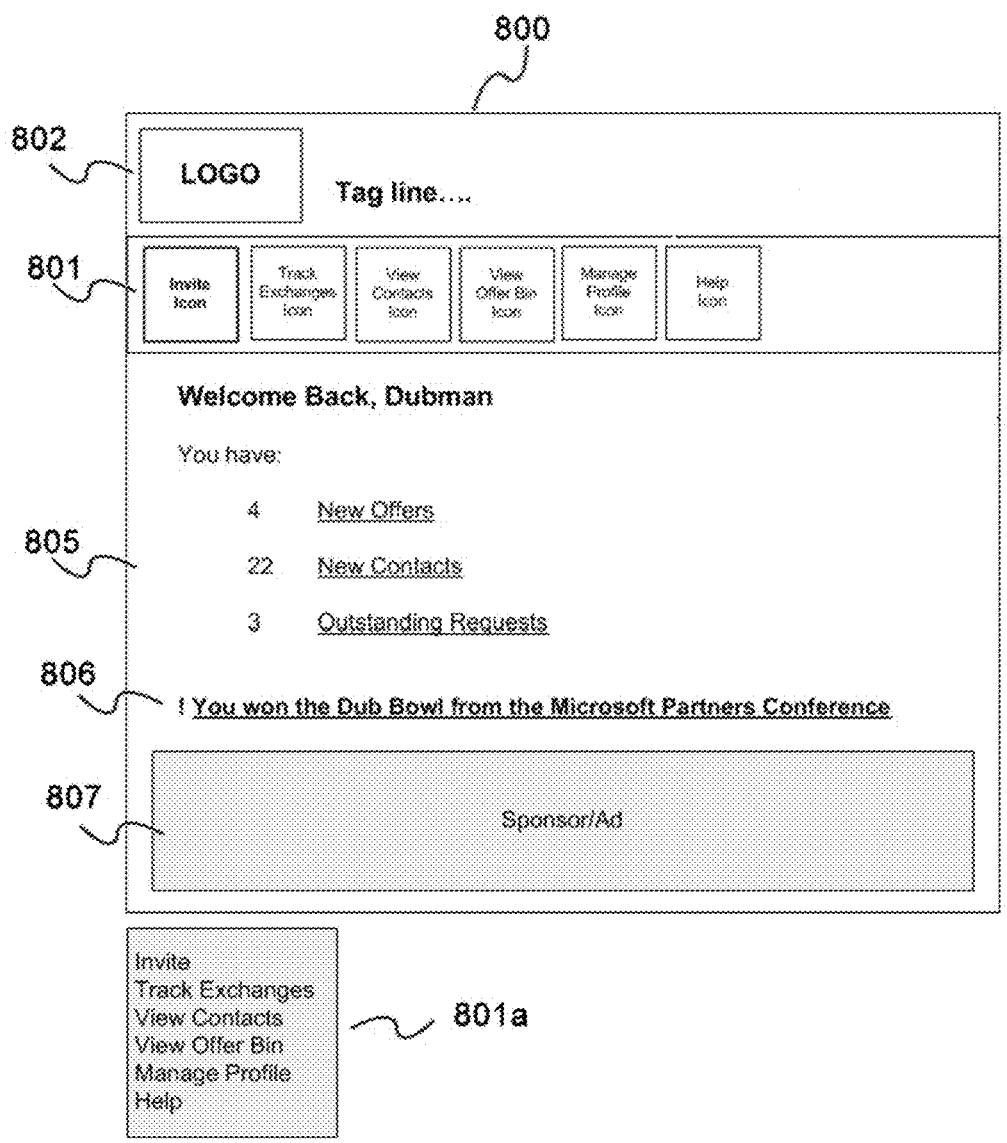
Figure 8C:
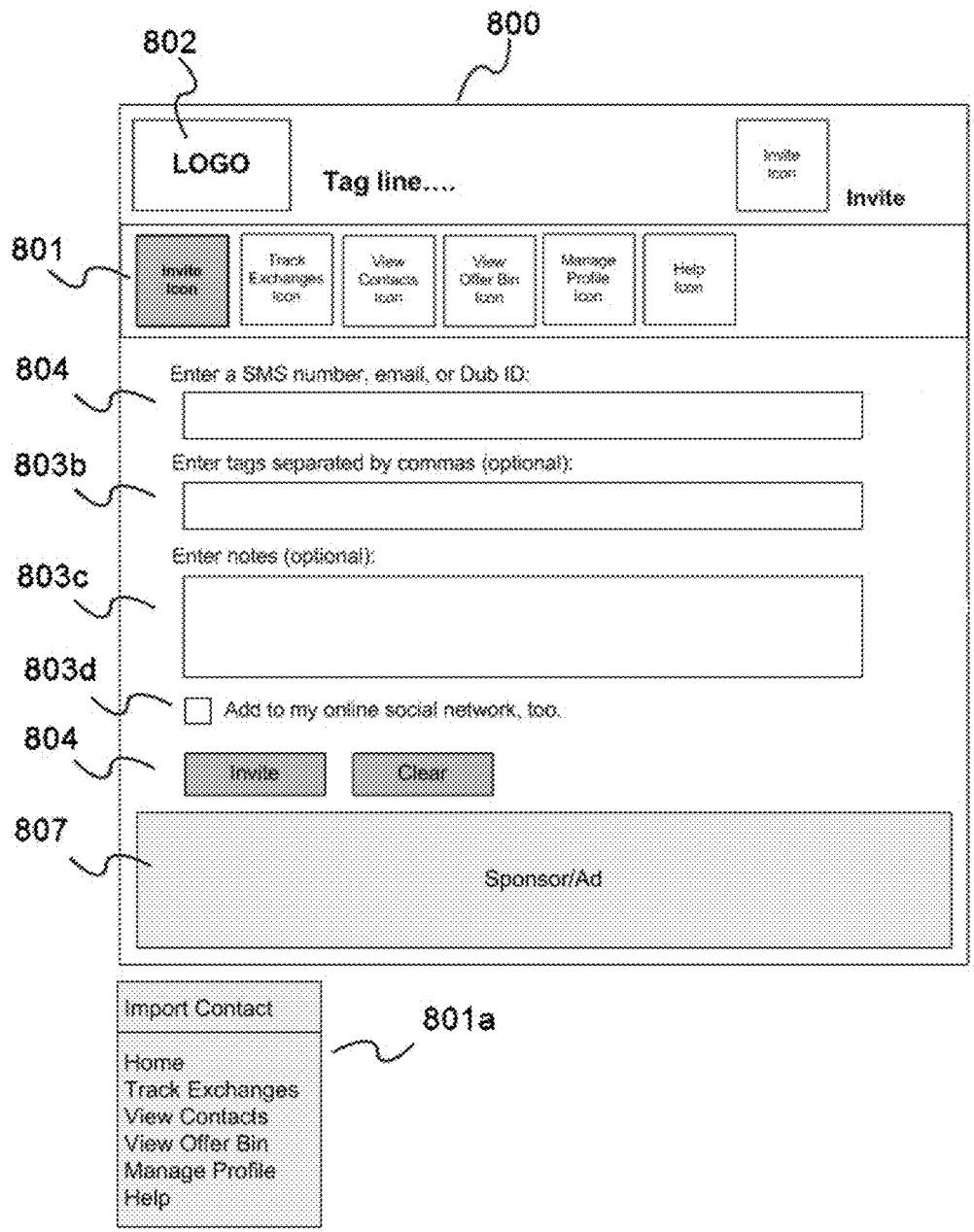
Figure 8D:
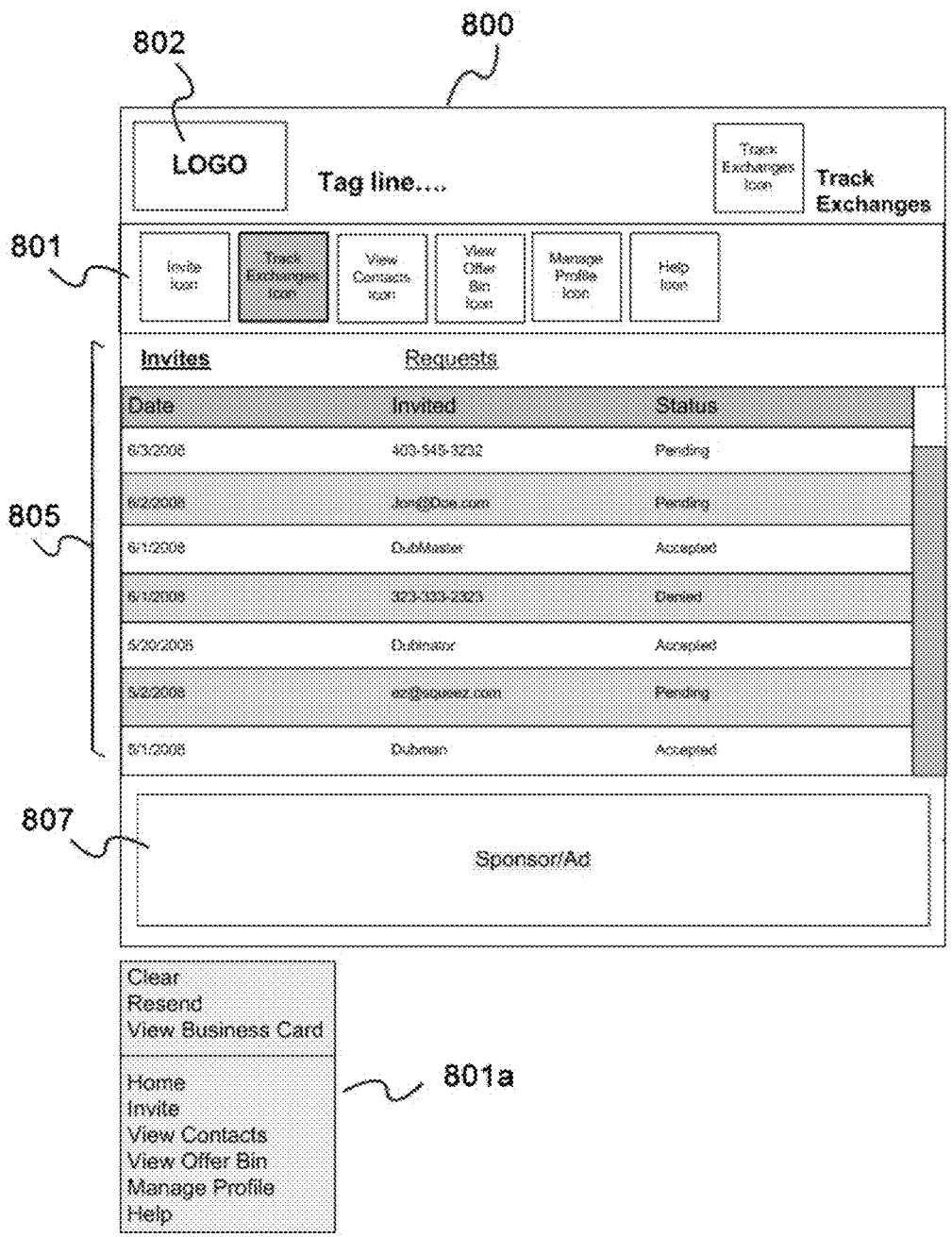
Figure 8E:
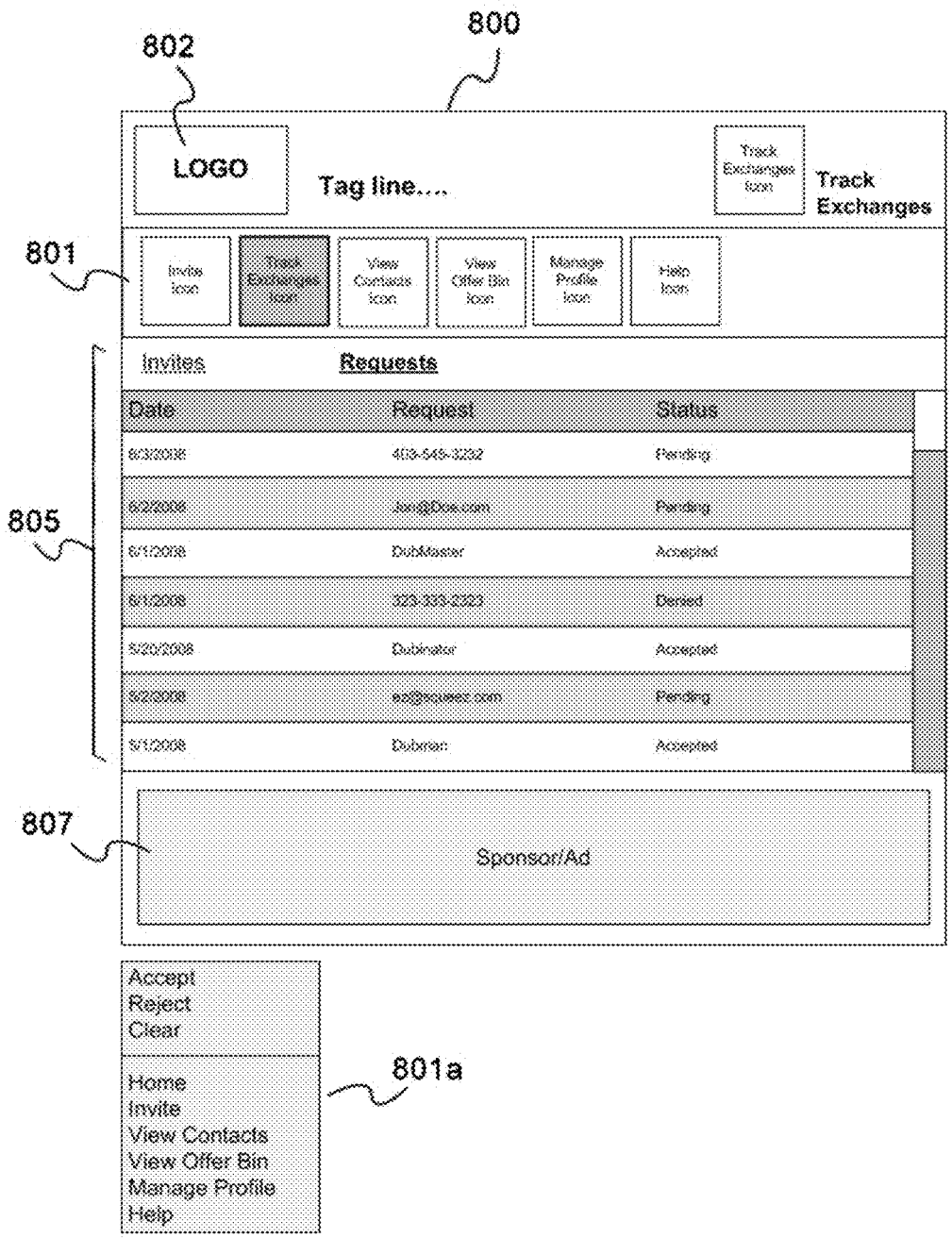
Figure 8F:
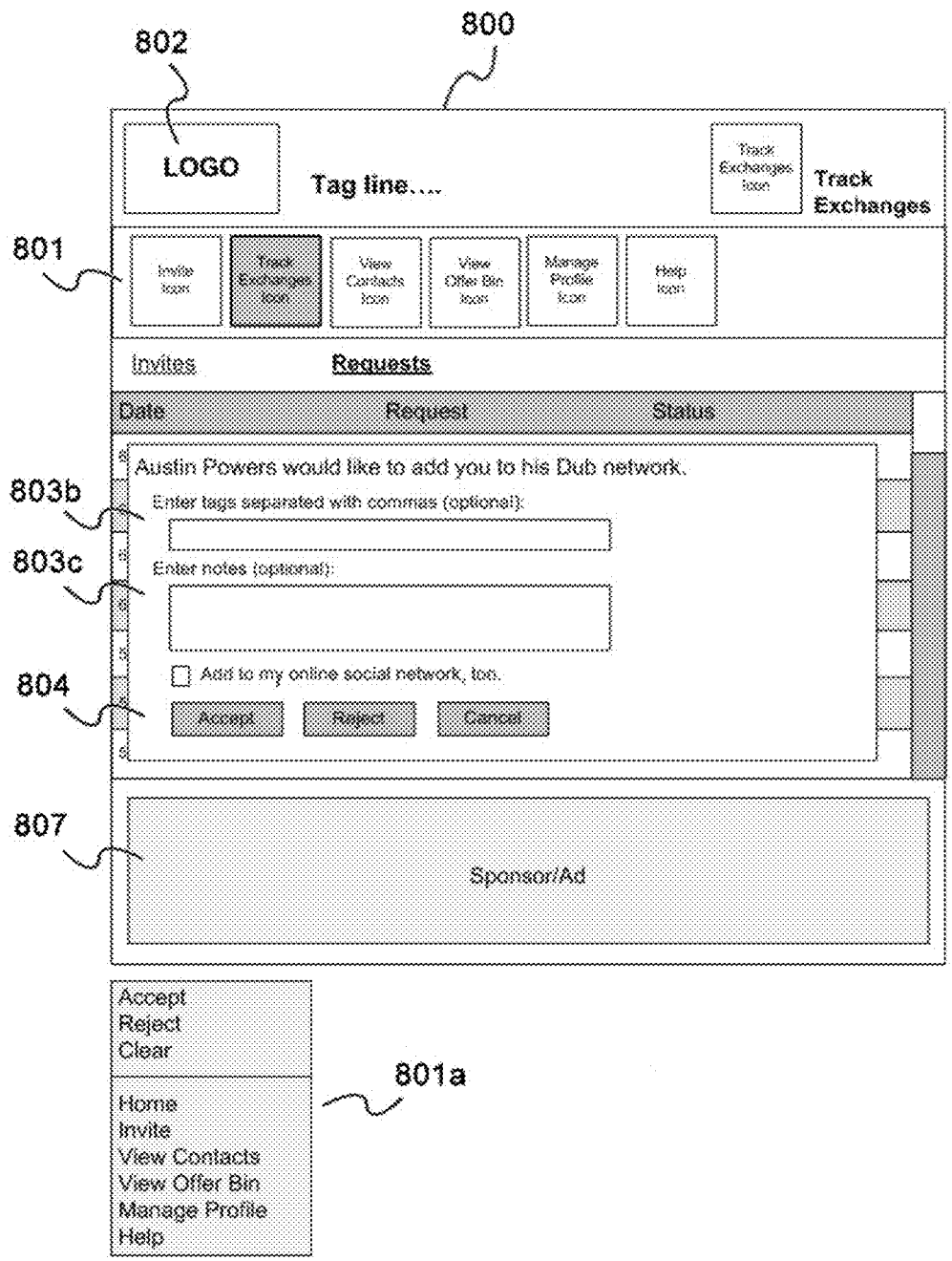
Figure 8G:
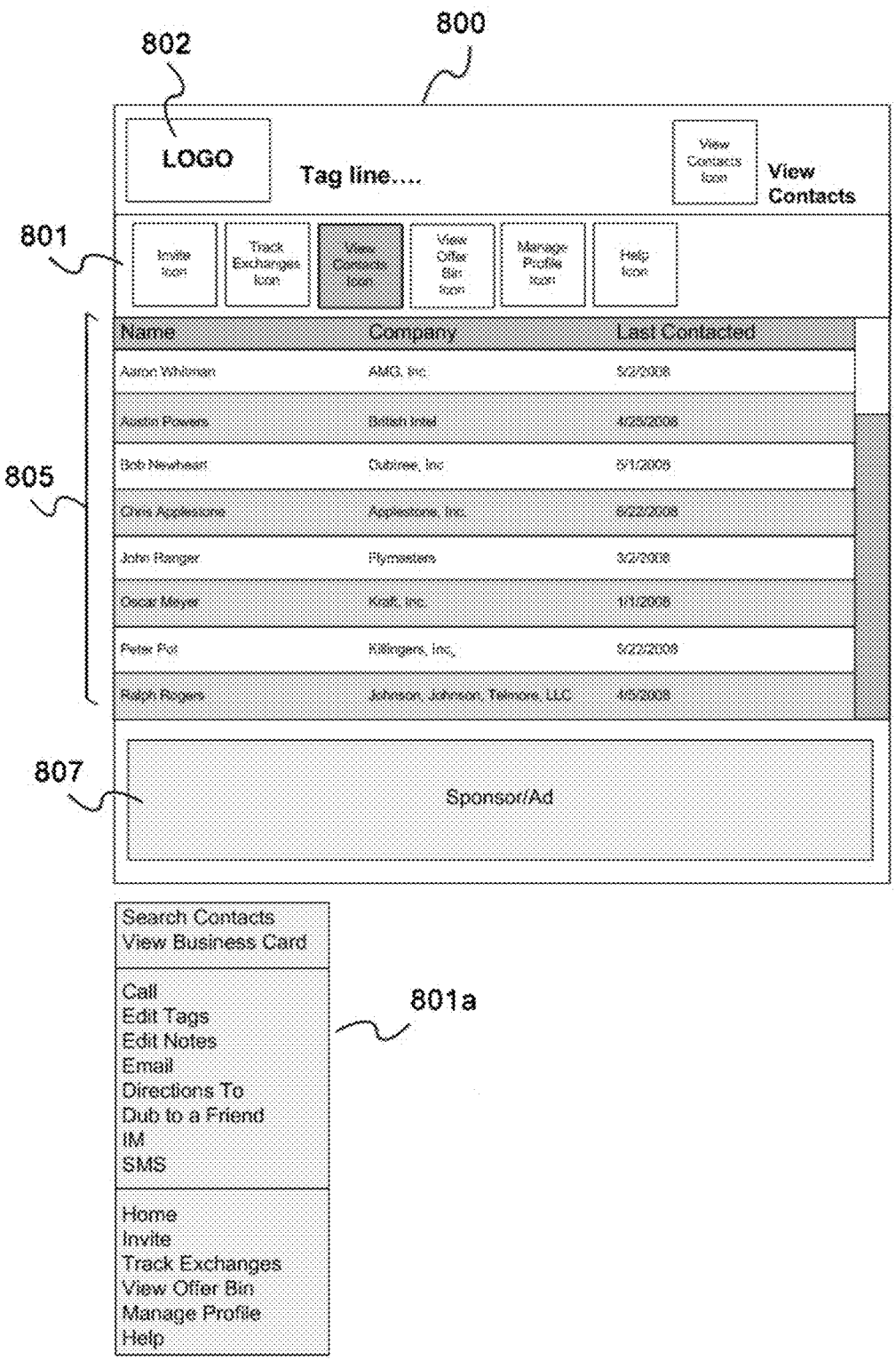

The recipient 203 may accept the request from the requestor 201 through information exchange server 206 on the recipient's 203 second mobile device 204 as illustrated in FIG. 8F. On acceptance of the request by the recipient 203, the information exchange server 206 may establish the connection between the requestor's 201 first mobile device 202 and the recipient's 203 second mobile device 204. In one embodiment, the information exchange server 206 may establish the connection between the requestor 201 and the recipient 203 via the SMS or the email before the mobile client 202a is downloaded and configured by the recipient 203 on the recipient's 203 second mobile device 204.

On acceptance of the request from the requestor 201 by the recipient 203, the information exchange server 206 transfers 106 the recipient profile 203a and the requestor profile 201a to the mobile client 202a on the requestor's 201 first mobile device 202 and the recipient's 203 second mobile device 204 respectively. The information exchange server 206 first transfers 106a the recipient profile 203a to the requestor's 201 first mobile device 202. The information exchange server 206 then transfers 106b the requestor profile 201a to the mobile client 202a on the recipient's 203 second mobile device 204. Although the exchange of each of the requestor's 201 and recipient's 203 profile information 201a, 203a is being sent from the information exchange server 206, it is to be understood that profile information 201a, 203a may be sent directly between the first mobile device 202 and the second mobile device 204, without having to go through the information exchange server 206. In such instances, copies of the profile information 201a, 203a may be sent back to the information exchange server 206 to update the information exchange server's 206 profile information 201a, 203a records.

The mobile client 202a on the requestor's 201 first mobile device 202 may store the transferred recipient profile 203a of the recipient 203 as a recipient business card. The mobile client 202a on the recipient's 203 second mobile device 204 may also store the transferred requestor profile 201a as a requestor electronic business card. For example, the mobile client 202a on the requestor's 201 first mobile device 202 may update a requestor address book 202f on the requestor's 201 first mobile device 202 by storing the electronic business card of the recipient 203 in the requestor address book 202f.

The mobile client 202a then automatically updates 107 the transferred recipient profile 203a on the requestor's 201 first mobile device 202 and the transferred requestor profile 201a on the recipient's 203 second mobile device 204 based on changes made to the recipient profile 203a and the requestor profile 201a by the recipient 203 and the requestor 201 respectively. The recipient 203 may make changes to the recipient profile 203a on the information exchange server 206 using the mobile client 202a on the recipient's 203 second mobile device 204. The recipient 203 may make the changes to the recipient profile 203a due to changes in one or more of job profile of the recipient 203, address of the recipient 203, phone number of the recipient 203, email address of the recipient 203, or any information or data stored or included in the recipient profile.

If the recipient 203 makes changes to the recipient profile 203a on the information exchange server 206, the information exchange server 206 may automatically transfer the changes made by the recipient 203 to the mobile client 202a on the requestor's 201 first mobile device 202. The automatic transfer may be in real time or near real time or pushed at logical intervals. For example, the mobile client 202a on the requestor's 201 first mobile device 202 and the information exchange server 206 may have a persistent internet protocol (IP) connection. The requestor 201 may then subscribe to receive the changes made by the recipient 203 automatically through the information exchange server 206 in real time. The mobile client 202a on the requestor's 201 first mobile device 202 may then automatically update the transferred recipient profile 203a on the requestor's 201 first mobile device 202 with the changes made by the recipient 203 to the recipient profile 203a. The mobile client 202a on the requestor's 201 first mobile device 202 may also automatically update the electronic business card of the recipient 203 with the changes to the recipient information in the requestor address book 202f of the requestor's 201 first mobile device 202. In addition, rather than a full time connection or periodic request, the system may employ a push technology or ping technology which acts when a profile is updated. The exchange server 206 upon receiving updated profile information would trigger an automatic push of the new information to the mobile device, with or without notification, or might ping the mobile device to accept the updated information.

Similarly, if the requestor 201 makes changes to the requestor profile 201a on the information exchange server 206, the mobile client 202a on the recipient's 203 second mobile device 204 may also receive the changes from the information exchange server 206. The mobile client 202a on the recipient's 203 second mobile device 204 may then automatically update the transferred requestor profile 201a on the recipient's 203 second mobile device 204 automatically with the changes made by the requestor 201 to the requestor profile 201a. The mobile client 202a on the recipient's 203 second mobile device 204 may also automatically update the electronic business card of the requestor 201 with the changes to the recipient information in the recipient address book 204a of the recipient's 203 second mobile device 204. The requestor 201 and the recipient 203 may also update one or more personal and business contacts selectively on the requestor's 201 first mobile device 202 and the recipient's 203 second mobile device 204 respectively. The mobile client 202a on the requestor's 201 first mobile device 202 and the recipient's 203 second mobile device 204 may also send requests to the information exchange server 206 at predefined intervals to automatically receive the changes to the recipient profile 203a and the requestor profile 201a respectively.

The requestor 201 may have access to the recipient profile 203a of the recipient 203 on one or more of the social network websites. The requestor 201 may then import and store the recipient profile 203a of the recipient 203 from the social network websites directly onto the requestor's 201 first mobile device 202 through the mobile client 202a on the requestor's 201 first mobile device 202. The information exchange server 206 may then automatically establish a connection between the requestor 201 and the recipient 203 when the requestor 201 imports and stores the recipient profile 203a on the requestor's 201 first mobile device 202 using the mobile client 202a. The recipient 203 may also import and store the requestor profile 201a of the requestor 201 from the social network websites directly onto the recipient's 203 second mobile device 204 through the mobile client 202a on the recipient's 203 second mobile device 204. The mobile client 202a on the requestor's 201 first mobile device 202 may also add (box 803d of FIG. 8C) or update the recipient profile 203a of the recipient 203 on one or more social networking websites on the internet with the transferred recipient profile 203a. The mobile client 202a on the recipient's 203 second mobile device 204 may also add or update the requestor profile 201a of the requestor 201 on one or more social networking websites on the internet with the transferred requestor profile 201a.

The first mobile device 202 and the second mobile device 204 may be any of the commercially available mobile phones and smartphones, for example, Blackberry, Palm, Nokia, Ericcson, Samsung, Android, iPhone, and/or any other commercially available mobile phone now known or later discovered in accordance with this invention. The requestor 201 and the recipient 203 may further create multiple profiles on the host website via the internet or via the mobile client 202a to provide context specific information. For example, if the recipient 203 is a friend or a family member of the requestor 201, the requestor 201 may create a personal profile to provide personal information to the recipient 203. If the recipient 203 is a business associate of the requestor 201, then the requestor 201 may create a business profile to provide business information to the recipient 203. The requestor 201 and the recipient 203 may tag context specific information (boxes 803b, 803c of FIG. 8C) along with the requestor profile 201a and the recipient profile 203a respectively as illustrated in FIG. 8C. The context information may comprise the location where the contact was made, the time the contact was made, shared interests and/or groups with the contact, personal and business notes, links to clients, and any other type of information intended to be memorialized about the contact. For example, the context information may comprise information noting the recipient 203 as a smart sales person or a known manager of a company. The mobile client 202a may also capture an image or image data such as a picture of the recipient to add to the recipient profile 203a.

The mobile client 202a may capture geographic information like date, time, and global positioning system (GPS) coordinates at the time of providing the requestor profile 201a and the recipient profile 203a by the requestor 201 and the recipient 203 respectively. The mobile client 202a may then send the captured date, time, and GPS coordinates to the information exchange server 206. The information exchange server 206 may store the requestor profile 201a and the recipient profile 203a provided by the requestor 201 and the recipient 203 respectively. The information exchange server 206 may also store the geographic information sent by the mobile client 202a.

The method disclosed herein further provides an electronic business card bowl application 208 for a business organization 207 with a business profile provided on the information exchange server 206 for collecting the profile information provided by customers using the mobile client 202a via the information exchange server 206. The method disclosed herein may provide an exclusive online business service to the business organization 207 to set up the electronic business card bowl application 208 on a business website of the business organization 207. The electronic business card bowl application 208 may store the profile information provided by the customers on a business website of the business organization 207. For example, the business organization 207 may receive profile information from the customers through the electronic business card bowl application 208 via the information exchange server 206. The business organization 207, for example, a chamber of commerce, business alliance, an association, a membership or club, a restaurant, a garment shop, a retail outlet, etc may then utilize the electronic business card bowl application 208 for ease of profile information transfer to attendees and for promotions of the business organization 207. For example, all the attendees of a given event or conference of the organization may be provided in a group or organization listing in the database 306 which would be available to other attendees through the information exchange server 206. Further, the business organization 207 may utilize the list of attendees such as for a contest offering prizes to the attendees or customers using the profile information of the attendees or customers stored by the electronic business card bowl application 208 through the information exchange server 206. An attendee or customer may send their profile to the business organization 207 though the mobile client 202a on a mobile device of the customer via the information exchange server 206 to avail business offers offered by the business organization 207. The business offers may comprise exchange of profile information of other attendees, notification mailing list entry, contest for free lunch, discount coupons, etc offered by the business organization 207.

Figure 8H:
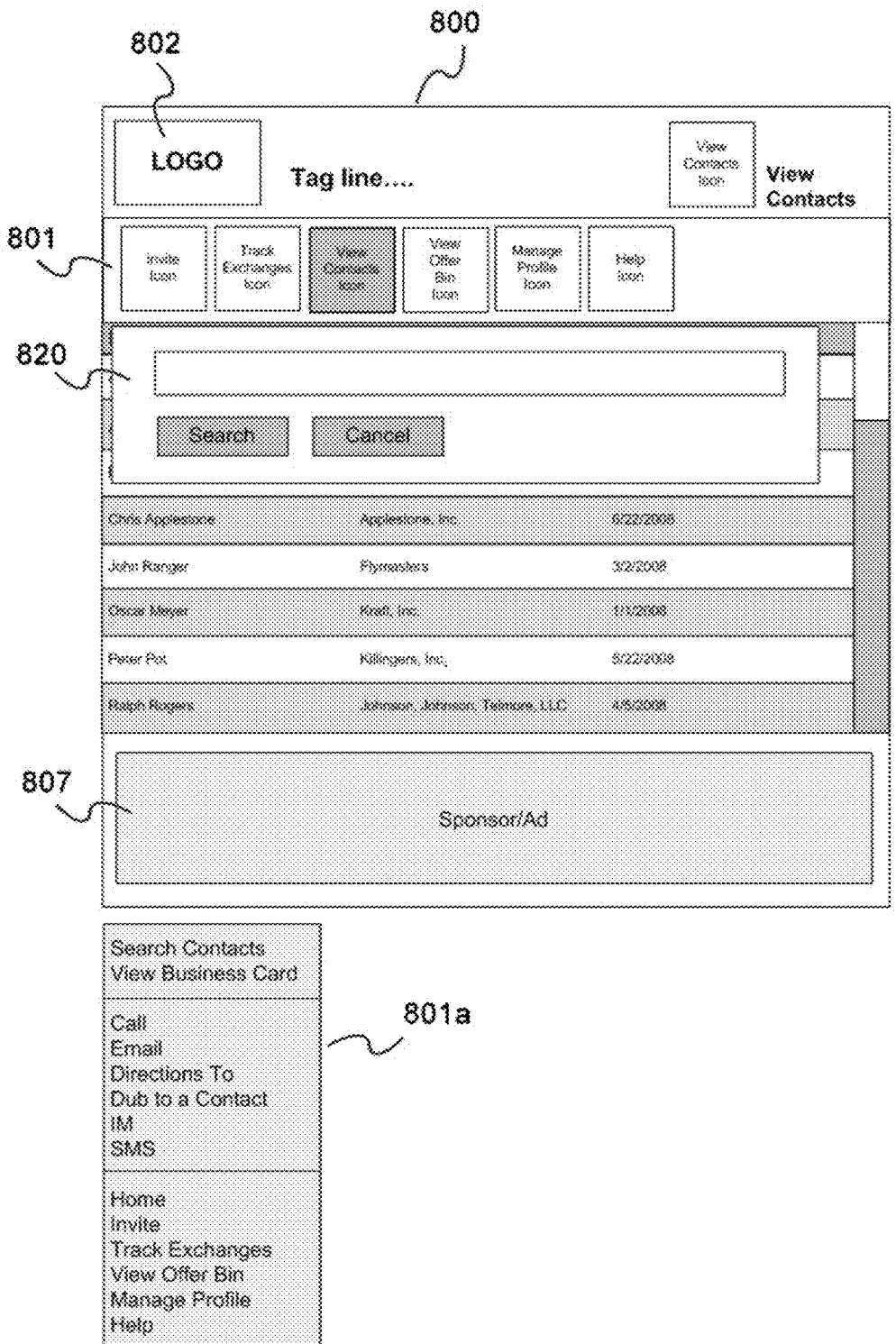
Figure 8I:
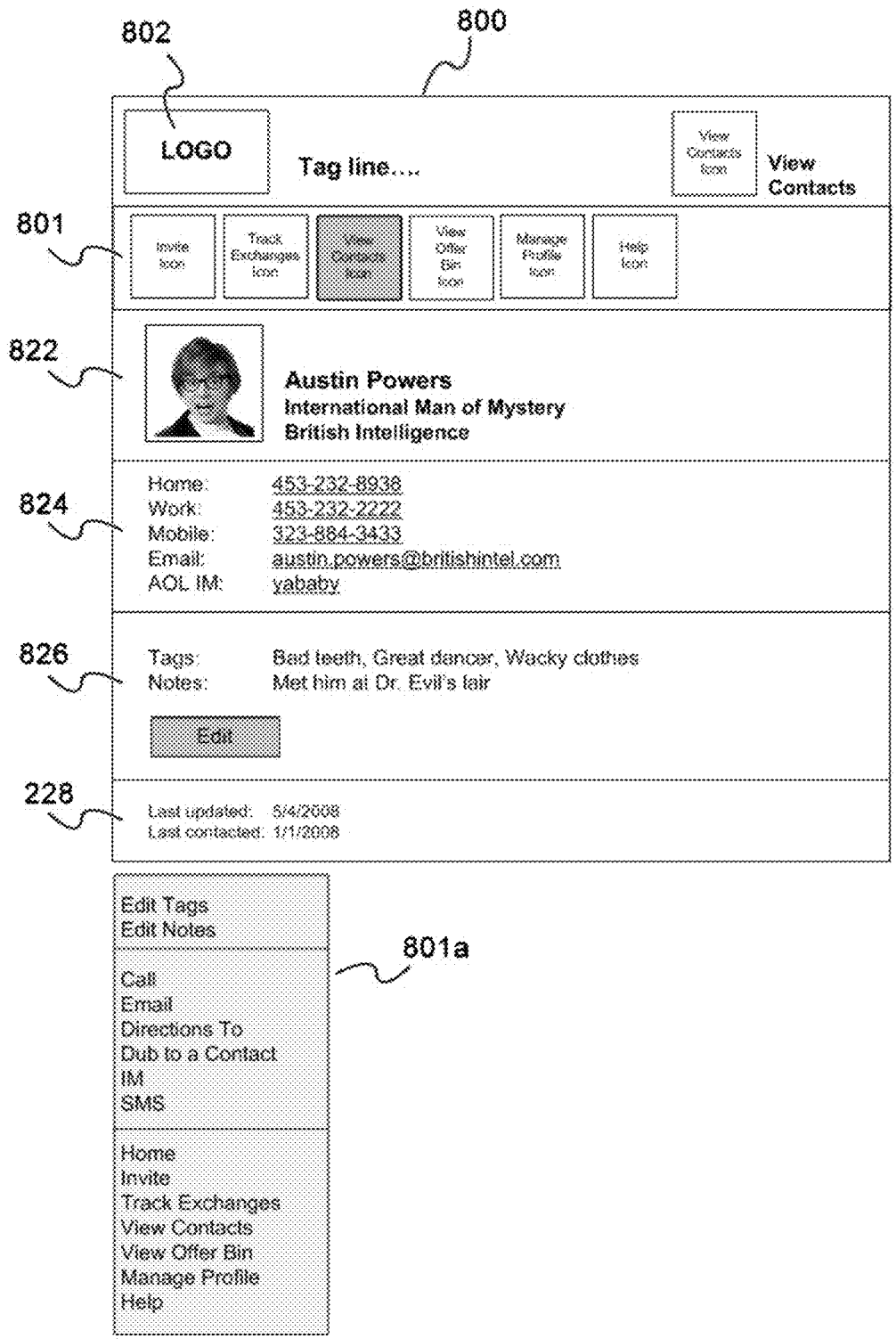
Figure 8J:
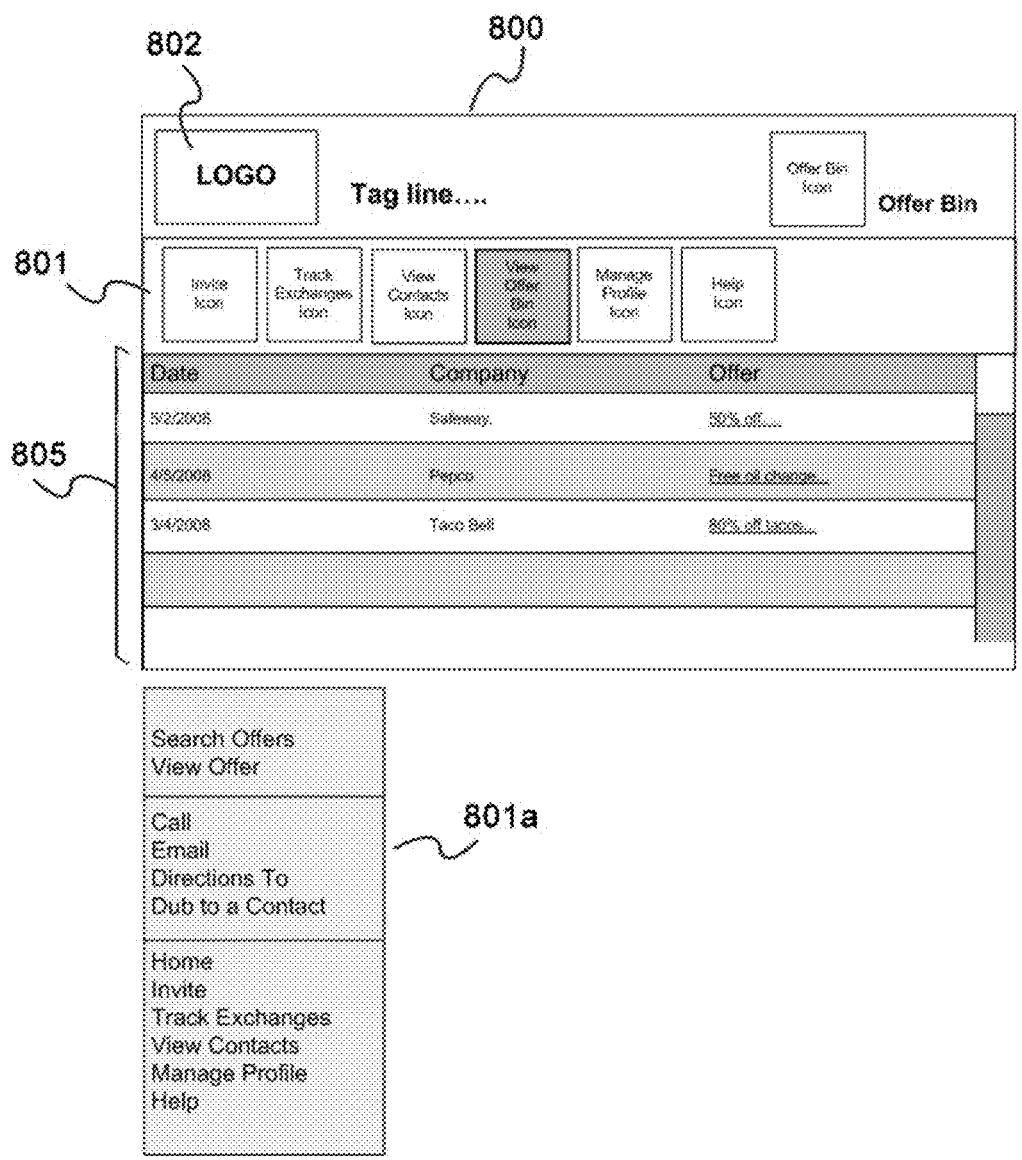
Figure 8K:
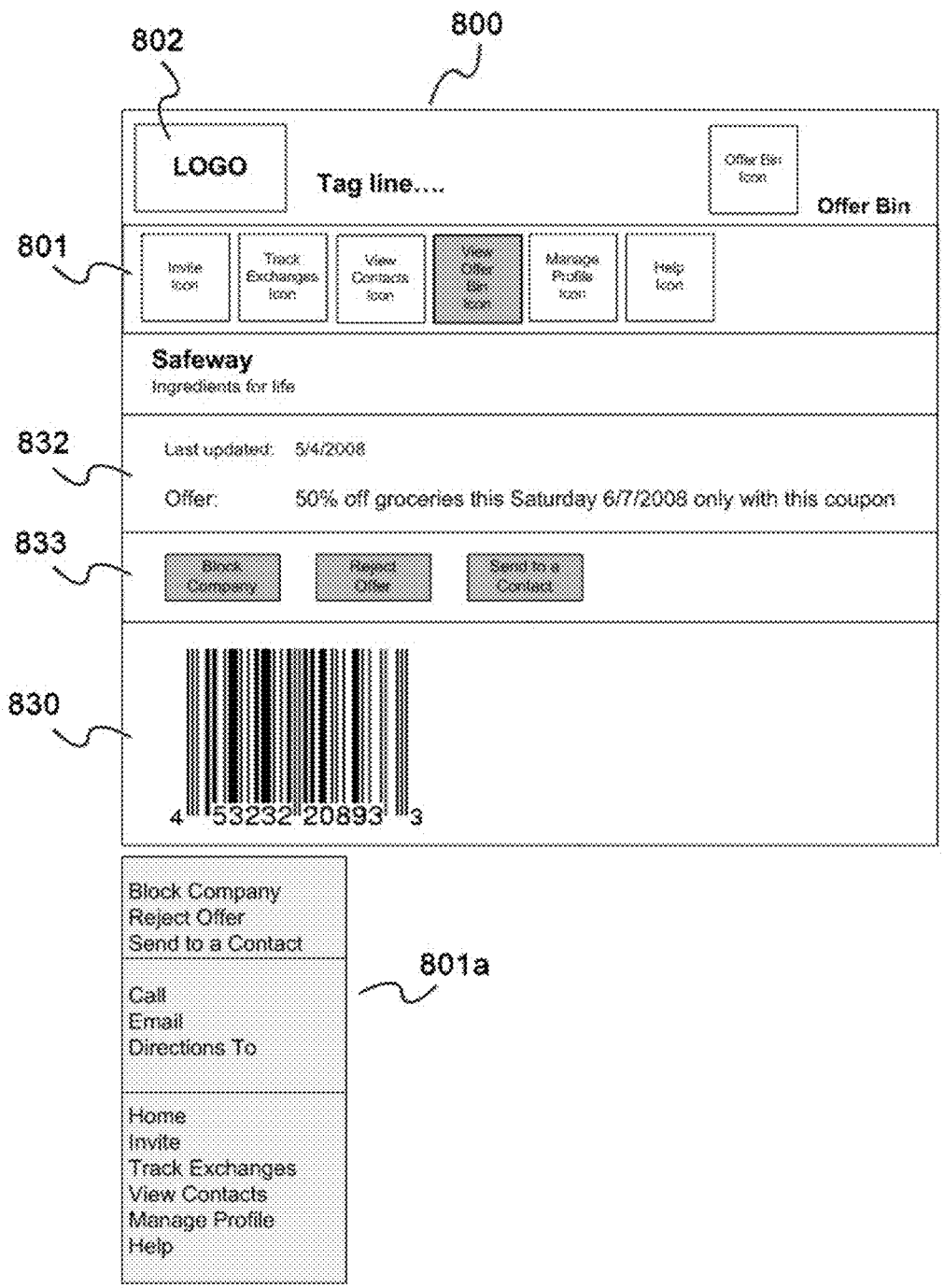

The mobile client 202a enables the requestor 201 and the recipient 203 to view the user interface 800 of the mobile client 202a as illustrated in the status box 805 in FIG. 8B, send the requests, accept the requests, view status of the sent requests or invites as illustrated in the "Track Exchanges Icon" user interface 800 shown in FIG. 8D. FIG. 8E shows a user interface 800 in which the requests received may be viewed in status box 805 as illustrated in FIG. 8E. The mobile client 202a also enables the requestor 201 and the recipient 203 to view list of contacts as illustrated in the user interface 800 illustrated in FIG. 8G. Using search query box 820 within the user interface 800, FIG. 8H illustrates how a particular contact may be searched for within a list of contacts, as well as to view and update the profile information, etc. In the user interface 800 shown in FIG. 8I, the mobile client 202a also enables the requestor 201 and the recipient 203 to view the profile information 822 of a particular contact, e.g., Austin Powers. As shown in this exemplary user interface 800, the contact profile information includes various types of information. In a first contact information identification box 822, along with the contacts name, company and position may be displayed. In a second box 824, various phone numbers, email, social networks and IM addresses may be displayed. In another box 826, other contextual information and private notes may be provided about the contact. This profile information may be accessed via the Internet and/or through the mobile client 202 on a requestor mobile device 202. At box 228, information about recent updates and last contacts with the person may be provided. Any one of the boxes, and or information in any of the FIGS. 8A-8K may be expanded to include an extensible set of icons and customizable links As depicted in the user interface 800 shown in FIG. 8J, business offers sent from advertisers may be viewed, and accept or rejected. FIG. 8K depicts another exemplary view for the user interface 800 in which additional business offers sent from advertisers may be reviewed in status box 805.

The requestor 201 and the recipient 203 may also use browser based computing devices to access an user interface similar to the mobile client 202a provided on the host website of the information exchange server 206 via the internet by registering on the host website and logging in. The mobile client 202a on a mobile device may maintain a log of calls, emails, text messages, etc. sent from the mobile device of the user The information exchange server 206 may also store the log of calls, emails, text messages, etc. sent from the mobile device of the user in an information database 206a of the information exchange server 206. The mobile client 202a may provide the user an optional offer bin facility for receiving advertisements from advertisers on the user's mobile device. The mobile client 202a may enable the user to send the profile information with the other users without disclosing phone number of the user. The mobile client 202a also enables the user to maintain a back up of the profile information of the other users on the user's mobile device in the information database 206a of the information exchange server 206. The user may retrieve the back up of the profile information of the other users from the information database 206a through the information exchange server 206 in case of loss or damage of the user's mobile device.

FIG. 2 illustrates a system of managing mobile exchange of profile information between a requestor 201 and a recipient 203. The system disclosed herein comprises a mobile client 202a provided on a requestor's 201 first mobile device 202, a recipient's 203 second mobile device 204, and an information exchange server 206 connected via a network 205. The mobile client 202a comprises an information input module 202b, a request module 202c, information update module 202d, and an offer bin module 202e. The information input module 202b enables the requestor 201 and the recipient 203 to provide requestor profile 201a and recipient profile 203a respectively to an information exchange server 206. The request module 202c requests for a connection with the recipient 203.

The information exchange server 206 comprises an information database 206a and an information transfer module 206b. The information database 206a stores the requestor profile 201a and the recipient profile 203a provided by the requestor 201 and the recipient 203 respectively through the mobile client 202a. The information database 206a also stores a log of calls, emails, and text messages sent from a mobile device using the mobile client 202a. On acceptance of the request for the connection from the requestor 201 by the recipient 203, the information transfer module 206b transfers the recipient profile 203a from the information exchange server 206 to the requestor's 201 first mobile device 202. The information transfer module 206b then transfers the requestor profile 201a to the mobile client 202a on the recipient's 203 second mobile device 204. The information update module 202d of the mobile client 202a on the first mobile device 202 automatically updates the recipient profile 203a and the requestor profile 201a transferred from an information exchange server 206 on the requestor's 201 first mobile device 202 and recipient's 203 second mobile device 204 respectively based on changes made to the recipient profile 203a and the requestor profile 201a by the recipient 203 and the requestor 201 respectively. The mobile client 202a may update an electronic business card of the requestor 201 and the recipient 203 in a requestor address book 202f of the requestor's 201 first mobile device 202 and a recipient address book 204a of the recipient's 203 second mobile device 204 respectively. The offer bin module 202e receives advertisements from advertisers on the mobile device using the mobile client 202a.

The system disclosed herein further comprises an electronic business card bowl application 208. The electronic business card bowl application 208 collects profile information provided by customers via the information exchange server 206 on a business website of the business organization 207 hosted by a business organization server.

Figure 3A:
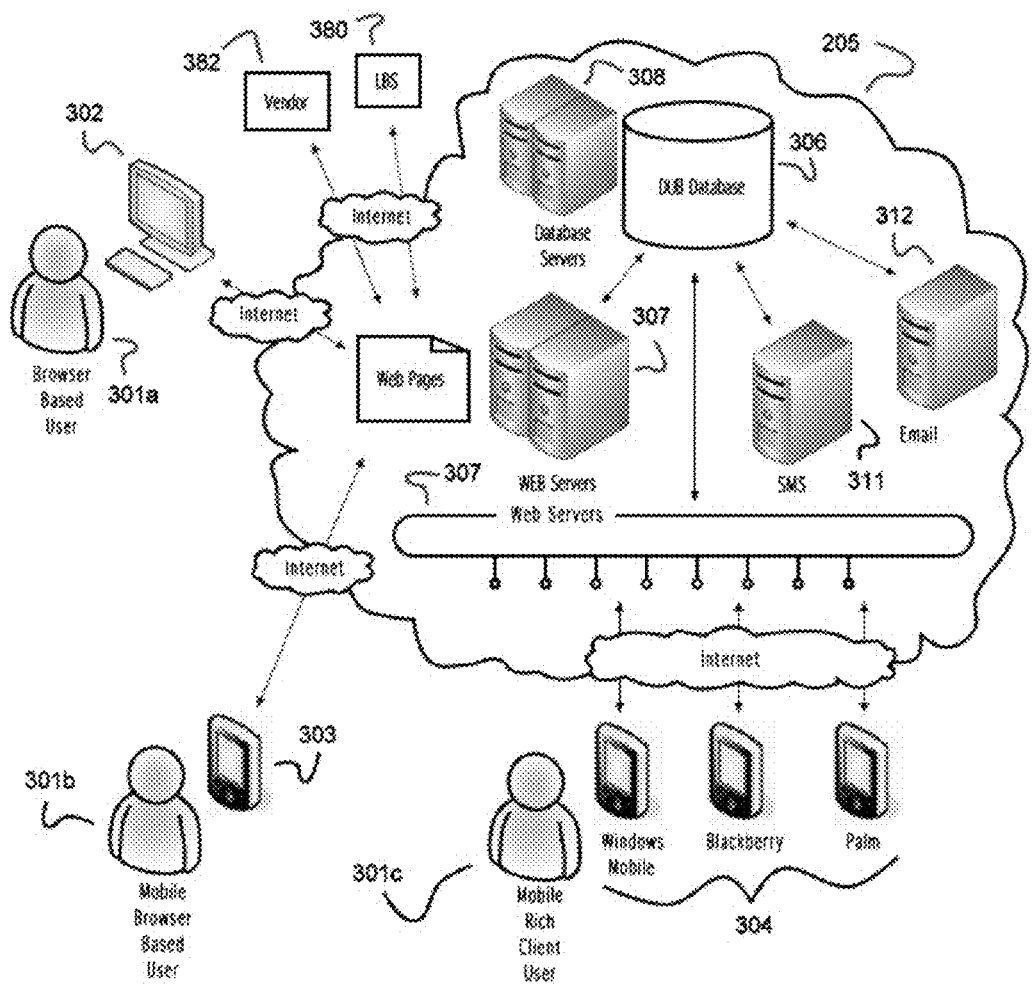
FIG. 3A exemplarily illustrates mobile exchange of profile information between computing devices via a network.

FIG. 3A depicts an exemplary illustration of an exchange of profile information between various computing devices via the network 205. As shown, a browser based user 301a is shown using a computing device 302, a mobile browser based user 301b is shown using a mobile device 303, and a mobile rich client user 301c is shown employing a smart phone 304 which may be connected through a web server 307 into one or more information exchange servers 308 via the network 205. Although each of the various computing devices 302, 303, 304 shown are connected through one of various users 301a, 301b, 301c interfaces, it is also within the scope of this invention to connect a mobile computing device into the information exchange servers 308 via a native user interface, and/or any other interface which does not require a web server 307. Although not specifically depicted, a mobile user (such as 301b) could be connected or interact with the system through use of SMS. In such an instance, the user would send an SMS message to one or more SMS codes with established instructions. For example, the mobile user 301b could send an SMS text to 38263: dubme john@myemail.com. The SMS message would be transmitted from the carrier to the system where it could be translated into http requests to interact with the API, servers 307, 308 and database 306 to execute the same functions and requests the user can employ through the mobile client 202a. In this instance, the instructions would be translated into an http request to interact with the API to transmit the user's profile to the recipient whose email is john@myemail.com.

Each of the user 301a, 301b, 301c interfaces may access data via a database server 308 from the information exchange servers 308 in a simple and clear format. According to this system, the addition of a new user interface can be integrated is an easy, suitable manner. As shown and in FIG. 3B, the architectural style is layered, and the logical architecture of the system is depicted from at least one mobile phone user interface down to the source database. It is to be understood that the layered architectural structure of this system may include more or less layers in accordance with this invention.

Figure 3B:
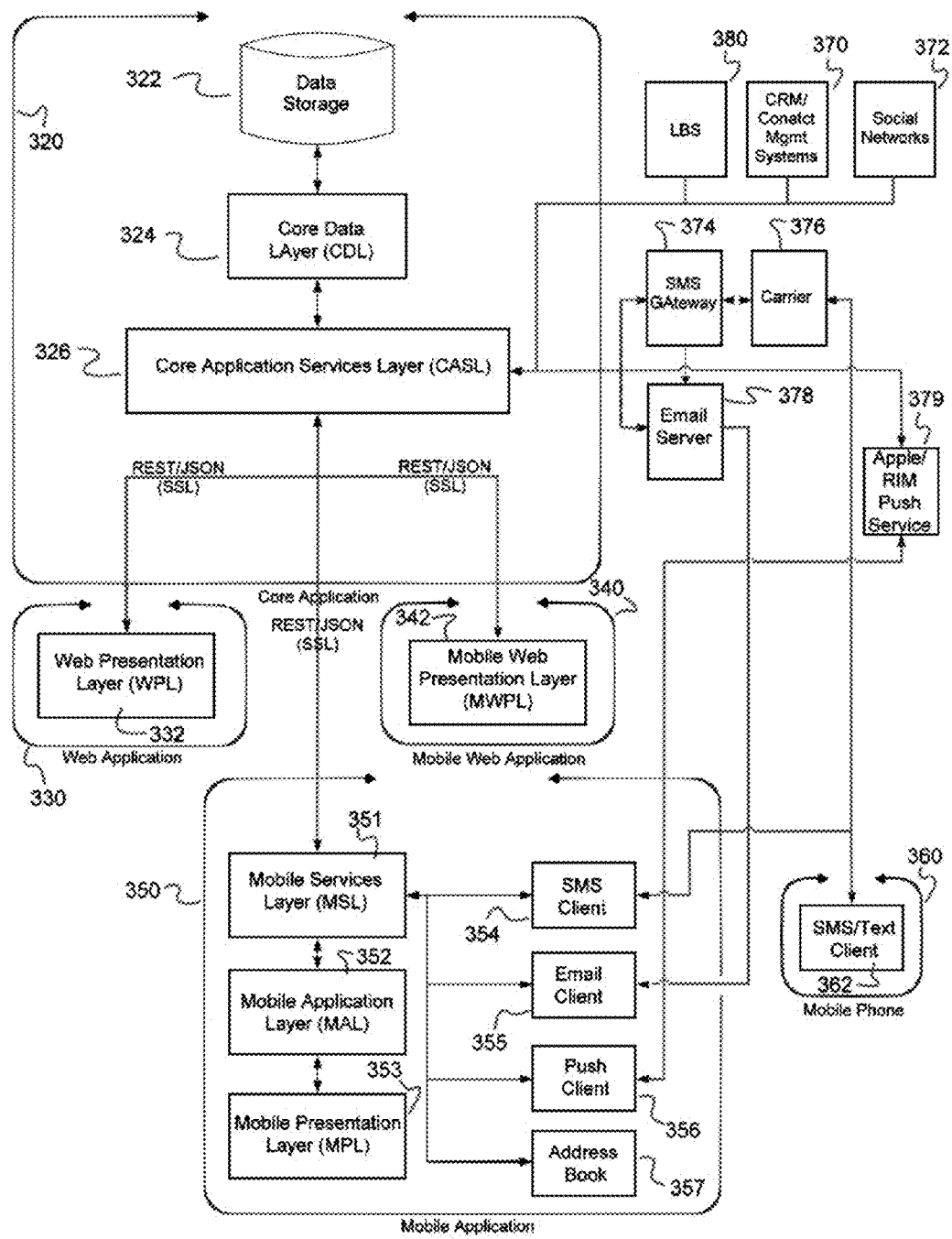
FIG. 3B is an exemplary logical system architecture for the mobile exchange of profile information between computing devices via a network.

FIG. 3A depicts an exemplary logical system architecture illustration in accordance with this invention. The object of this architecture is to coordinate the transfer, extraction, storage and representation of data information to and from the existing legacy systems, the exchange servers of this invention, and the various computing devices 302, 303, 304 operated by the various users 301a, 301b, 301c. FIGS. 3A and 3B show a system including at least three different users 301a, 301b, 301c. The various interfaces may run on any one of, or many, number of different operating systems, including but not limited to Windows®, Linux, WAP, MIDP, Symbian, Pocket PC, and or any other platform now known or later discovered in accordance with this invention.

In FIG. 3A, the web servers 307 communicate with one or more storage databases, such as the database servers 308 and a proprietary database 306, such as herein named and shown "DUB Database." The web servers 307 handle the HTTP protocol to enable the exchange of the profile information between the storage databases 306, 308, the browser-based user 301a, the mobile browser-based user 301b, the mobile rich client user 301c via the Internet. As previous described, the user could interact with the system through SMS or an SMS client on the mobile device send SMS messages to the network which are then converted into http requests. Likewise, the web servers 307 provide the interface capability for sending the email and/or SMS to the browser-based user 301a, the mobile browser-based user 301b, and the mobile rich client user 301c via the internet or the network 205 can be used to send SMS messages to mobile devices which are set to receive SMS through user preference or mobile device limitations. The web servers 307 also provide the capability of pushing updated application code or profile information to the browser-based user 301a, the mobile browser-based user 301b, and the mobile rich client user 301c via the internet.

In FIG. 3B, the mobile application 350 communicates into the core application 320. As depicted, the web application 330 and a mobile web application 340, are connected to and between the mobile application 350 and the core application 320. As shown, the web application 330 is composed of a web presentation layer (WPL) 332, and the mobile web application 340 is composed of a mobile web presentation layer (MWPL) 342. Both of these applications transform and represent the profile information in a manner in which the target mobile device can handle and eventually display the profile information on a user interface to the user.

According to this invention, it is to be understood the API's integrated herein provide both front end and back end APIs for integration. For front end integration, REST/JSON APIs and SDK may be provided for iPhone, Blackberry, Windows Mobile, Android, and other similar operating mobile devices. A Javascript library may also be available to integrate the systems and methods of this invention with Web-based interfaces. On the backend, this invention may integrate an asynchronous integration pipeline that ties outbound requests off its invitation, or connection process. Various pre-built providers (e.g., Salesforce, LinkedIn, Siebel, SugarCRM, Twitter) may be leveraged, or customized applications may be developed and integrated. Likewise, organizations can push data from their systems and the methods described in this invention enable data n information within the present invention to be pushed into other organization systems seamlessly.

Communication to and from the web application 330 and the web presentation layer (WPL) 332 may leverage representational state transfer (REST) as a preferred software architecture style for distributed hypermedia systems such as the World Wide Web. However, it is to be understood that any suitable architecture style may be implemented in accordance with this invention. As shown, the MIME type of the data supported by the web service is JSON. However, other suitable types may include, such as for example, XML, YAML, and or any other valid MIME type, now known or later contemplated in accordance with this invention. The semantics of REST notifications can easily be expressed in JSON format and are easy to parse and handle in the JavaScript environment. In this example, both of the UIs are browser-based, however, as mentioned before, it is also possible to choose to implement native or alternative wireless UIs, and/or the like which may not be browser based. Adding a new interface into this architecture could be accomplished through the addition of a new component at the presentation layer.

In the core application 320, various components are provided including data storage 322, a core data layer (CDL) 324, and a core application services layer (CASL) 326. Together, the various components provide the requisite logic and applications for processing the data and providing the profile information data to the user interface of the mobile devices 302, 303, 304 for the various users 301a, 301b, 301c.

In the mobile application 350, various other components are provided including a mobile services layer (MSL) 351, a mobile application layer (MAL) 352, and a mobile presentation layer (MPL) 353. The mobile services layer (MSL) 351 exchanges data information with an SMS client 354, an email client 355, a push client 356 and an address book 357 resident in the mobile application 350. It is to be understood that the mobile application 350 is adapted to host various additional clients not shown, albeit readily available. Together, the various layers 351, 352, 353 in the mobile application 350 include the requisite logic and support applications to process the data to and from the core application 320 in order to provide the profile information data to the various users 301a, 301b, 301c.

As shown in FIG. 3B, various services may communicate and exchange data information between the core application services layer 326 and the various clients 354, 355, 356 in the mobile application 350. By way of example, an SMS/Text client 362 resident on the mobile phone 360 communicates from a carrier 376 and through an SMS gateway 374 and/or through an email server 378 back into the email client 355 or the SMS client 354 within the mobile application 350. Alternatively, where a push type service 379 is used on a mobile computing device, such as with Apple and RIM products, text generated from the SMS text client 362 would be transmitted into the push client 356 within the mobile application 350. Although SMS and email are described in detail, it is to be understood that any type of suitable messaging format may be integrated in accordance with this invention, such as for example, short codes, MMS, USSD and/or any other suitable messaging service now known or later discovered.

In FIG. 3B, various other services are shown integrated into the systems and methods of this invention, such as, for example, the integration of a customer relationship management (CRM) contact management system 370, and/or the social networks 372. Data information gathered from the CRM contact management systems 370 and the social networks 372 may be sent into the core application services layer (CASL) 326. As shown, a location based service (LBS) 380 may be integrated into this invention. The LBS system 380 can provide information about the current position of a mobile device, as well as comparison and relative data of two mobile devices in proximity with each other. Various commercially available location based services may be used, such as for example, GPS, cell tower triangulation techniques, and any other suitable position locating technology.

The CRM contact management system 370 may be used in combination with the systems and methods of this invention in such a way that proprietary sales data information about a carrier's vendors and their partners may be securely shared with a proprietary sales person in the carriers 376 employ. In more detail, an aspect of this invention is to allow the carrier employee access to carrier's client database while under carrier's employ. However, carte blanche access may not be desired by the carrier. Consequently, certain identity information about the carrier's proprietary contact information may be masked so that if the employee should leave the carrier's employ, the carrier employee will be disconnected from acquiring access to the carrier client database, as well as lacking the ability to further access the carrier's client database. It is to be understood that various types of contact managements systems may be employed, such as, Siebel on Demand, Sales Force, as well as other contact management databases such as LinkedIn, MS Dynamics, Twitter, MySpace, and any other now known or later discovered contact management database.

The Location Based Service 380 element can operate in a variety of different ways. According to a first embodiment, a one-to-one social encounter may take place in which a requestor 201 and a recipient 203 encounter each other. Although the one-to-one social encounter has been described in detail with respect to FIG. 2, an additional aspect of this scenario is such that the location based service 380 may be integrated into the one-to-one encounter. This feature would allow a requestor 201 and a recipient 203 having a mobile client 202a installed on each of their phones respectively, to exchange profile information without the need to manually enter an email address, an identification code or a phone number. Employing the location based service 380, equipped for example with GPS or cell tower triangulation techniques, and within predetermined time interval, the information exchange server 206 may match and compare incoming exchange requests and present participating users with a list of available participating users. That is, where the requestor 201 and a recipient 203 desire to share profile information 201a, 203a, both the requestor 201 and the recipient 203 may initiate the exchange of their profile information nearly simultaneously by, for example, selecting an assigned button on their respective mobile devices 202, 204. LBS 380 may then determine whether the requestor 201 and the recipient 203 are proximally close to each other and have both selected to share their profile information at approximately the same time with each other. The need to identify and associate a specific ID code with the encounter may not be necessary because the LBS 380 may determine that since the first mobile device 202 and the second mobile device 204 are substantially close to each other and have both selected to share profile information with another mobile device in close proximity to them, the likelihood that they are both requesting each others profile information is highly certain. The information exchange server 206 can send a verifying message to both the first mobile device 202 and the second mobile device 204 requesting verification that they desire to exchange profile information with each other. Upon acceptance, the requestor profile 201a and the recipient profile 203a may then be exchanged with each other wirelessly. Although described as a one-to-one encounter, it is also possible to implement this process in a group setting where more than one mobile device is available to share each of their respective profile information amongst the group. Once the profile information has been accepted, the profile information will be shared and populated into the requestors address book 202f and the recipients address book 2041 respectively. According to this embodiment, there isn't a need to manually accept and/or transcribe the data manually into the address book.

According to another exemplary embodiment, a social group encounter may take place in which a requestor 201 and a number of recipients 203 may introduce themselves to each other and desire to exchange profile information, which is typically done by sharing business cards with each other. In this scenario, a single group identification code associated with the social event may be generated, tagged and associated with the particular social event. This scenario works well, for example, in situations where various unfamiliar participants attend a conference, a large meeting, and the like. The multiple attendees, herein, the requestor 201 and the various recipients 203, may share their profile information 201a, 203a with each other. Those in attendance at the event may wish to share their profile information with others at the social event. In operation, attendees at the social event may send their own profile information via the Internet or from a mobile client 202a resident on their mobile device into the information exchange server 206 via the group identification code. The information exchange server 206 will then compile all of the received profiles, match the requestors 201 with the recipients 203 and share the respected profile information 201a, 203a. An acceptance policy may be embedded such that an acceptance message is first sent to the requestor's 201 user interface prompting the requestor 201 to decline or approve the sharing of the profile information with the recipient. Any further modification to a particular profile in the group will be subsequently updated and revised at the information exchange server 206 and thereafter transmitted to all group member participants associated with that group identification code.

According to another exemplary embodiment of invention, a single group coordinator may be established who controls what profile information may be shared amongst a member's only directory defined group. The member's only directory may be accessed via the Internet or the mobile client 202a. The member's only directory may display only selected public information to the other members of the group. The individual members can exchange profile information from the member directory. The group can be un-moderated or moderated. An un-moderated group can be set up by one of the participants via the Internet or through the mobile client 202a by entering a group name and a group identification code associated with the member directory. By sharing this group identification code with others, the other participants can join the member directory group.

A moderated group is one in which a single group coordinator may be established who controls what profile information may be shared amongst the members only directory defined group. The group coordinator maintains management control of the profile information of each of the participants. The group coordinator can choose to selectively share information with each of the participants as a group and/or individually. For example, a university may be given the management control as a group coordinator. Various types of participants may subscribe to the university group, such as for example, alumni, current students, prospective students and faculty. Where an alumni participant may be concerned, all other alumnis may share profile information amongst each other, the group coordinator would solely control the sharing of this information amongst the various alumnis. Where a student is concerned, the group coordinator may selectively share profile information about faculty pertinent to that student's class schedule. Furthermore, where a prospective student may be concerned, the group coordinator may selectively share profile information about admission counselors and/or other information about programs or classes within the university. It is to be noted that the information tagged and shared to selected sub-groups within the university group may include, but is not limited to, personal profiles but may include data information about events, activities, programs, and the like. The group coordinator may also manage the permission of the user or organization to upload existing contact lists. Likewise, the group coordinator may manage member requests.

As part of the management of member requests, the group coordinator can setup "segments" which will allow them to associate members and tag them with words, phrases and/or terms they define. For example, the group coordinator may choose to tag a member to "employee", "partner", "vendor" or "recruiting candidate." This feature is beneficial for marketing purposes. In addition, the group coordinator may customize the registration pages for new users and setup response emails, and/or other alerts when new users attempt to join. The various directories and tags may be tied to various back end systems in accordance with this invention.

It is to be understood that various types of controls and profiles may be created for a particular user. For example, a user may have a first business profile set up with his/her professional information and associated data. Likewise, the user may have a second social profile set up with his/her casual/social information and associated profile information data. Depending upon the environment in which the user is a participant, the user may selectively share one of the particular profiles with a recipient. Likewise, the user may opt-in to make all or portions of his/her personal contact information private to other users who already have their current profile information. Selectable security elements may be tied to various portions of the profile information which may be made visible or invisible to a recipient 203 of the profile information.

In the instance where a group coordinator or organization is managing various pieces of profile information, various privacy controls may be set that would apply to all members in that particular group, such as employees of the organization. The privacy controls can be applied to any profile field, such as in this example to email and phone numbers. Once the profile field is set to private, it cannot be viewed on the user's profile information. The group coordinator may apply privacy controls selectively to various requestors 201 and recipients 203 as it deems fit. Although the profile field for the email and/or phone number may be set to private and is hidden from the recipient 203, the recipient 203 of the profile information may still be able to email or call the person since the contact information including email address and phone number is still available to the information exchange server 206. A masked phone number and/or email may be used to communicate between the participants. The ability to communicate, and various other controls tied to the profile information, may be modified as desired. For example, if the requestor 201 decides later to prevent the recipient 203 to communicate with her, then the requestor 201 may select a "disable communication" profile field so that the recipient 203 can no longer call or email her.

According to another aspect of the invention, the information exchange server 206 may capture and include selective membership and financial information in a user's profile information, such as membership, loyalty and credit card account numbers. Examples of such membership and financial information include information typically fond on shopping and gym membership cards, shopping loyalty cards, frequent flyer accounts, bank debit and credit cards and the like. The compilation of this profile data information comprises a digital wallet. The advantage of the digital wallet is that the user would no longer have to carry multiple cards in a wallet but would have quick access and use of the information in a secure fashion.

By way of example, when a user wishes to make a financial transaction the user initiates the payment process by selecting the Vendor 382 (FIG. 3A) listed on the mobile device 202 and entering the amount of the transaction. The mobile device 202 transmits the vendor information, the transaction number, the amount of the transaction, and the user information to the information exchange server 206. The information exchange server 206 then pulls the financial information such as the credit card information of the user from the database 306 and transmits the information to the vendor 382. The vendor's system would then validate the transaction and send confirmation to the point of sale (POS) terminal at the location where the user is making the mobile payment to complete the transaction. Through use of the present invention, the user's information need not be displayed on their mobile device and all private information can be masked locally on the mobile device 202. Masking the private information thereby prevents theft from onlookers or anyone that sees, holds, or takes the user's mobile device 202.

The system of the present invention could also employ a peer to peer transaction by pushing contact information from the mobile device 202 to the POS terminal directly or through the information exchange server 206. In this embodiment, the POS terminal would receive a request from the mobile device which includes the user's profile. The Vendor 382, upon receipt of the request, would receive the transaction amount and user's profile information and would then connect to the network 205 to receive the user's financial credit card information. The vendor 382 would then approve the transaction or could transmit an SMS message or email message to the user's mobile device 202 to verify the transaction and amount.

The user may selectively separate and assign the credit cards in the digital wallet depending on whether the nature of the financial transaction to be made is one which is defined as a social or business related transaction. For example, at a business function, if a financial transaction is to be accomplished, the user may conduct a financial transaction with a credit account number related to her business account. Alternatively, the user may desire to make a financial transaction using a non-business related credit account number stored in her digital wallet in a social environment. The exchange of information between the requestors 201 mobile device 202 and the information exchange server 206 containing the digital wallet information may be performed using secured encrypted signaling of information at the time of the transaction throughout the system so as to prevent the sensitive financial information from being illegally accessed. Separate identification codes may be assigned to the various accounts numbers in the digital wallet and securely stored at the information exchange server 206, as well as in the requestors 201 mobile device 202.

As mentioned briefly above, identification codes may be associated with various types of membership accounts and rewards programs. The average person carries numerous membership and/or rewards cards on her person. Keeping track of these various membership cards can be cumbersome and monotonous. Thus, according to this invention, it is possible to associate one or many identification codes with each of the user's membership and/or rewards cards. By doing so, the need to carry various membership and/or rewards cards is eliminated.

Retrieval of a particular identification code may be achieved in numerous ways. In one example, the location based system 380 may be employed to automatically determine the location of the mobile device 202 of a user. The location based system 380 may determine the position of a mobile device 202 of a user in a number of commercially available ways, for example, using GPS, XY coordinates as registered by a cell tower, triangulation and/or any other suitable means for determining the location of the mobile device 202 of the user.

For example, FIG. 8K depicts an example user interface 800 that may be prompted as soon as the user enters and/or comes close to the location of the grocery store (i.e. Safeway). As shown, when the information exchange server 206 has acknowledged that a requestors 201 mobile device 202 is within a predetermined proximity of the Safeway, various information such as the offer 832 "50% off groceries this Saturday 6/7/2008 only with this coupon" is sent to the requestor's 201 mobile device 202 and displayed on the user interface 800. The requestor 201 may select from a variety of buttons 833 to block, reject or send the offer to another contact. Various types of information may be provided from the information exchange server 206 to the user interface 800 of the mobile device 202. A scanning barcode 830 may also be displayed as shown on the user interface 800 for use upon checkout from the grocery store. The advantage of providing this information accessible by the requestors 201 mobile device 202 is that the requestor 202 will not have to carry a variety of rewards card associated with numerous different establishments. Other membership and/or rewards programs may be utilized in a similar manner to the one described above, for example, walking into a gym, a requestor 201 may transmit an identification code with her mobile device 202 to the information exchange server 206, which in turn would transmit the appropriate profile information for that particular member to the Vendor 382 (as seen in FIG. 3A) through the betwork 205. The profile information returned from the information exchange server 206 could also be shared directly from peer to peer from the requestors 201 mobile device 202 to a receiving device at the gym, and/or a copy of the returned profile information may be directly sent to the gym establishment with a participating identification code and connected to the network 205. Likewise, purchases at these various establishments may also be made via the convenience of the requestors 210 mobile device 202 and an associated identification code. The benefit of the systems and methods of this invention is that personal and financial profile information may be securely embedded and masked on the requestor's mobile device 202 yet quickly and conveniently used at the appropriate establishments thereby eliminating the need to physically carry a wallet and/or purse. Leveraging this system, up-to-date contact profile information can be shared with various requesting parties such as, but not limited to, universities, organizations, billing agencies, and the like.

Another aspect of the present invention is to enhance the user's interactivity with their contacts and provide updates/feeds from various different social networks with full interactivity. The present invention enables the requestor 201 or the recipient 203 to set include within their profile all of their social media profile information including the following: LinkedIn, Salesforce, Siebel, Twitter, Dynamics, Facebook, Myspace, Orkut, Plaxo, Bebo, Friendster, FriendFeed, Xanga, Yahoo, SugarCRM, BlackberryPush, iPhonePush, Geo Location Service, Digg, Vimeo, YouTube, Flickr, loopt, Brightkite, Google LAttitude, Yelp, Delicious, and IMs like Yahoo, AOL, Google Talk, MSA, iChat. Recipients of a profile could then decide manually or set their account to automatically follow or connect to social network accounts of new or updated profiles. For example, if a requestor 201 has a Twitter account identified in their profile the recipient could set their preferences to automatically follow the requestor on Twitter. The system and methods of the present invention can act as a central hub or messaging center for all communications and connections within the social spectrum relating to the participating contact or profile with which a user had connected.

Figure 4:
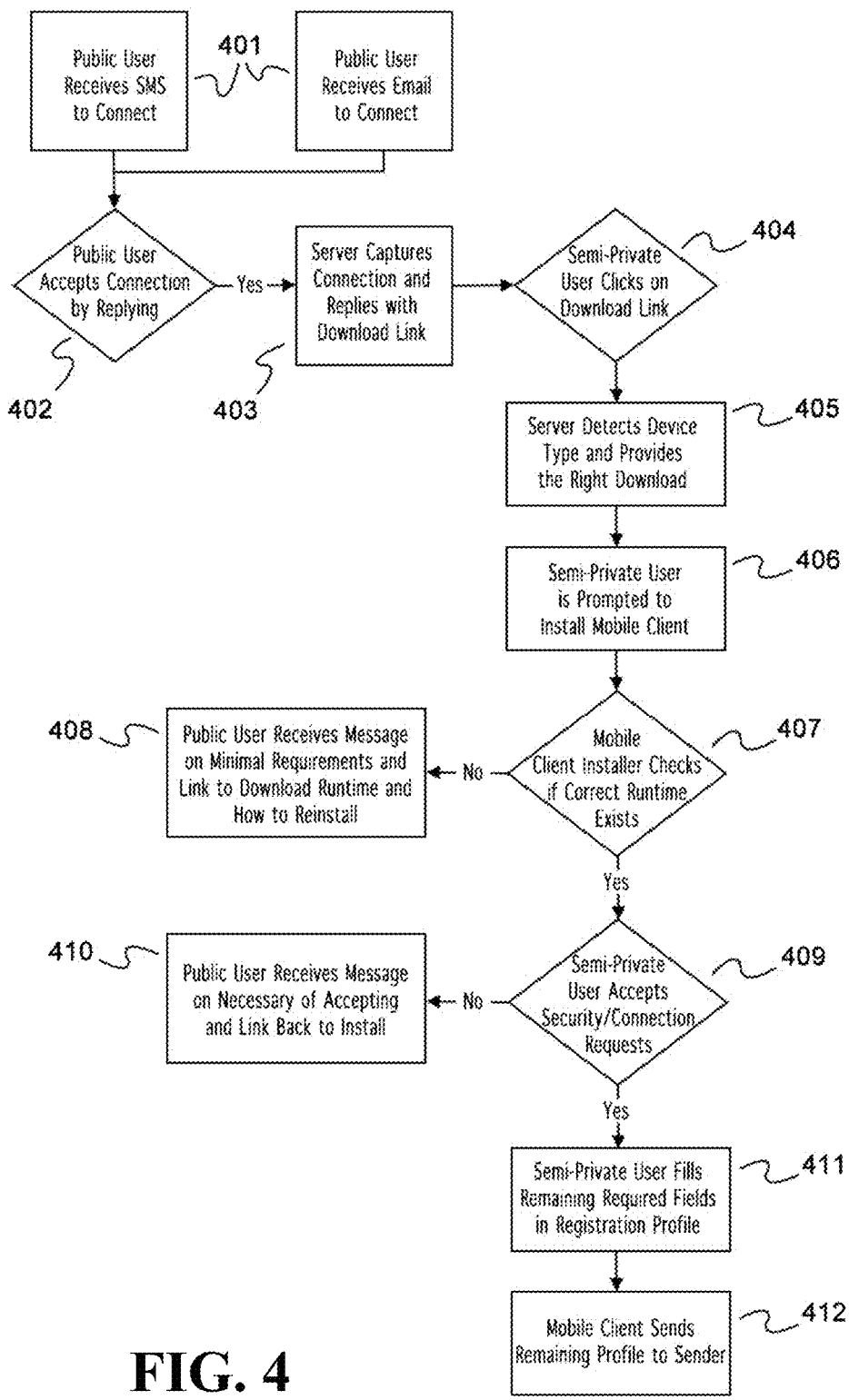
FIG. 4 exemplarily illustrates a flowchart of a process of a recipient installing a mobile client on a mobile device of the recipient based on request for connection by a requestor.

FIG. 4 exemplarily illustrates a flowchart of a process of a recipient 203, herein referred to as a "public user", installing a mobile client 202a on a mobile device of the public user based on a request for connection by a requestor 201. The requestor 201 requests for a connection with the public user using the mobile client 202a on the requestor's 201 mobile device. The public user may receive 401 the SMS or the email from the requestor 201 on the mobile device through the information exchange server 206 via the internet. If the public user accepts 402 the request for connection by the requestor 201, the information exchange server 206 captures 403 the connection and replies with a download link for enabling the public user to download the mobile client 202a on the public user's mobile device. On acceptance of the request to download, the public user becomes a semi private user. The information exchange server 206 then provides minimal information stored in the information database 206a, required for the establishing the connection. The semi private user first receives the download link from the information exchange server 206 to download the mobile client 202a. The semi private user then clicks 404 on the link to initiate a mobile client installer application provided by the information exchange server 206 to download the mobile client 202a. The information exchange server 206 detects 405 the mobile technology on the semi private user's mobile device and provides an appropriate download of the mobile client 202a. The mobile client installer application then prompts 406 the semi private user to install the mobile client 202a.

The mobile client installer application checks 407 if correct runtime of the mobile client 202a exists while downloading the mobile client 202a. If the mobile client 202a does not have the correct runtime, information on minimal requirements for installation and link to download the proper runtime is provided 408 on the semi private user's mobile device. The mobile client installer application then installs the mobile client 202a on the semi private user's mobile device. The semi private user then accepts 409 connection requests made by the requestor 201 via the information exchange server 206 through the mobile client 202a installed on the semi private user's mobile device. The semi private user then fills 411 required information fields in the semi private user's registration profile on the mobile client 202a. On completion of the filling of the information fields by the semi private user in the semi private user's registration profile, the semi private user becomes a private user. The mobile client 202a then sends 412 the registration profile of the private user to the information exchange server 206.

Figure 5:
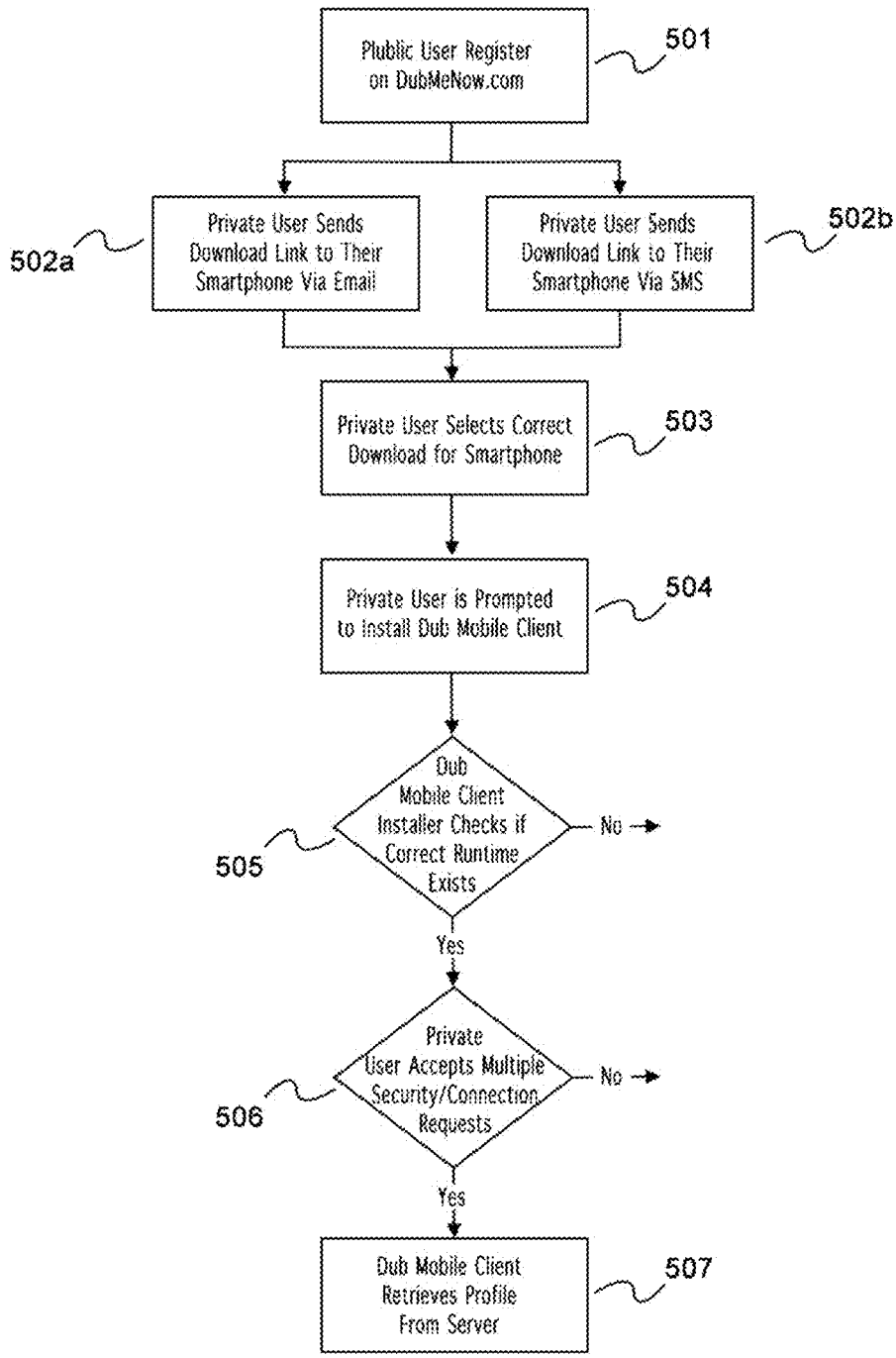
FIG. 5 exemplarily illustrates a flowchart of a process of a public user installing a mobile client on a smartphone.

FIG. 5 exemplarily illustrates a flowchart of a process of a public user installing a mobile client 202a on a smartphone. The public user registers 501 on the host website implemented on the information exchange server 206. The public user then provides a user profile to the information exchange server 206 during the registration. On registration, the public user becomes a private user. The private user then sends 502a and 502b a hyperlink from the host website to the private user's smartphone via an email or an SMS to download the mobile client 202a on the private user's smartphone. On receiving the hyperlink, the private user then selects 503 correct download for the smartphone. The private user is then prompted 504 to install the mobile client 202a. A mobile client installer application then checks 505 if correct runtime of the mobile client 202a exists while downloading the mobile client 202a. If the mobile client 202a does not have the correct runtime, information on minimal requirements for installation and link to download the proper runtime is provided on the private user's smartphone. The mobile client installer application then installs the mobile client 202a on the private user's smartphone. The private user then accepts 506 multiple security and connection requests from the information exchange server 206 through the mobile client 202a installed on the private user's smartphone. The private user then retrieves 507 the private user's user profile from the information exchange server 206 using the mobile client 202a on the private user's smartphone.

Figure 6:
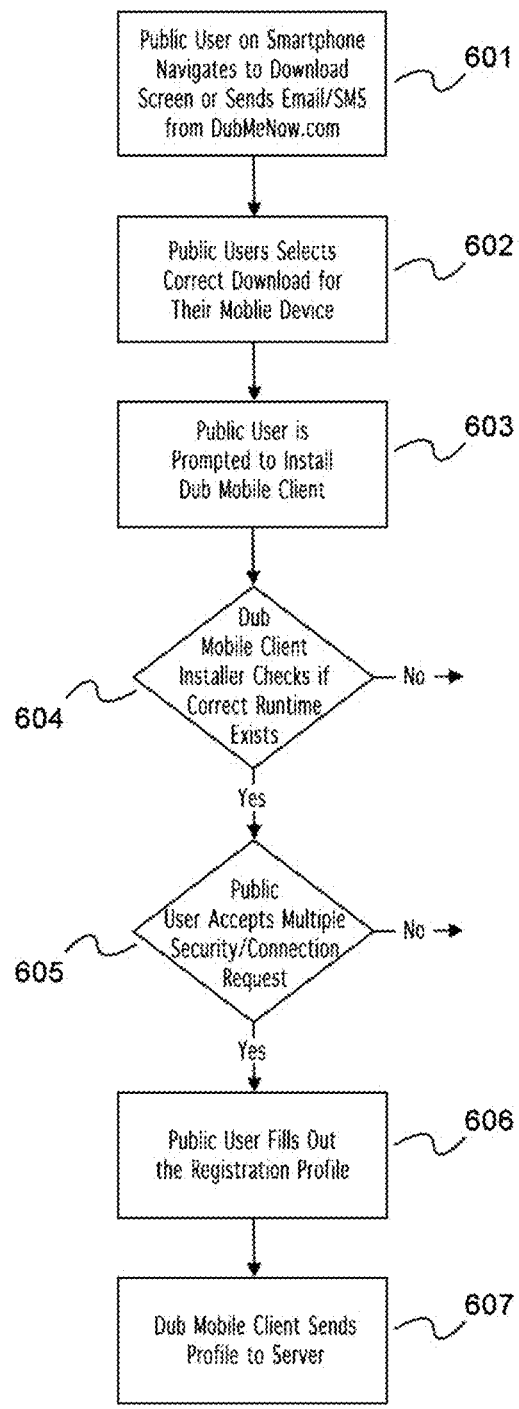
FIG. 6 exemplarily illustrates a flowchart of a process of a public user installing a mobile client on a smartphone by accessing a host website from the public user's smartphone.

FIG. 6 exemplarily illustrates a flowchart of a process of a public user installing a mobile client 202a on a smartphone by accessing a host website from the public user's smartphone. The public user navigates 601 to a download mobile client screen from a host website using a web browser on the public user's smartphone. The public user then selects 602 correct download for the smartphone. The public user is then prompted 603 to install the mobile client 202a. A mobile client installer application then checks 604 if correct runtime of the mobile client 202a exists while downloading the mobile client 202a. If the mobile client 202a does not have the correct runtime, information on minimal requirements for installation and link to download the proper runtime is provided on the public user's smartphone. The mobile client installer application then installs the mobile client 202a on the public user's smartphone. The public user then accepts 605 multiple security and connection requests from the information exchange server 206 through the mobile client 202a installed on the public user's smartphone. The public user then fills 606 required information fields in the public user's registration profile using the mobile client 202a. The mobile client 202a on the public user's smartphone then sends 607 the registration profile to the information exchange server 206.

Figure 7:
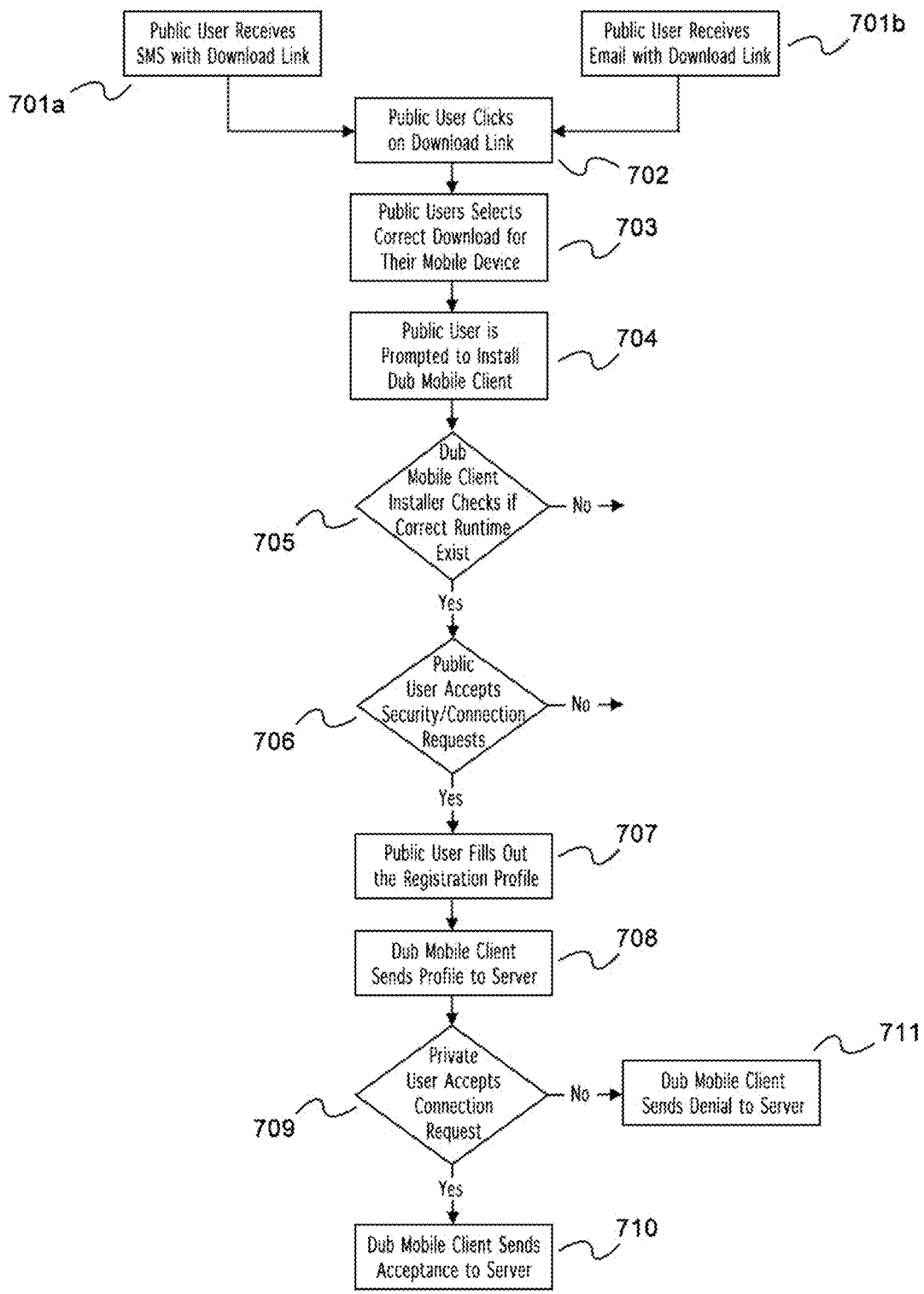
FIG. 7 exemplarily illustrates a flowchart of a process of providing a mobile client to a public user.

FIG. 7 exemplarily illustrates a flowchart of a process of providing a mobile client 202a to a public user. The public user receives 701a and 701b an email or an SMS with a download link from the information exchange server 206. The public user then clicks 702 on the download link. The public user then selects 703 correct download for the smartphone. The public user is then prompted 704 to install the mobile client 202a. A mobile client installer application then checks 705 if correct runtime of the mobile client 202a exists while downloading the mobile client 202a. If the mobile client 202a does not have the correct runtime, information on minimal requirements for installation and link to download the proper runtime is provided on the public user's smartphone. The mobile client installer application then installs the mobile client 202a on the public user's smartphone. The public user then accepts 706 security and connection requests from the information exchange server 206 through the mobile client 202a installed on the private user's smartphone. The public user then fills 707 required information fields in the public user's registration profile using the mobile client 202a. The mobile client 202a on the public user's smartphone then sends 708 the registration profile to the information exchange server 206. On sending the registration profile, the public user becomes a private user. The information exchange server 206 then sends connection request to the private user's smartphone for establishing connection between the private user and other private users. If the private user accepts 709 the connection request, then the mobile client 202a sends 710 the acceptance to the information exchange server 206. If the private user declines 709 the connection request, then the mobile client 202a sends 711 the denial to the information exchange server 206.

Figure 9:
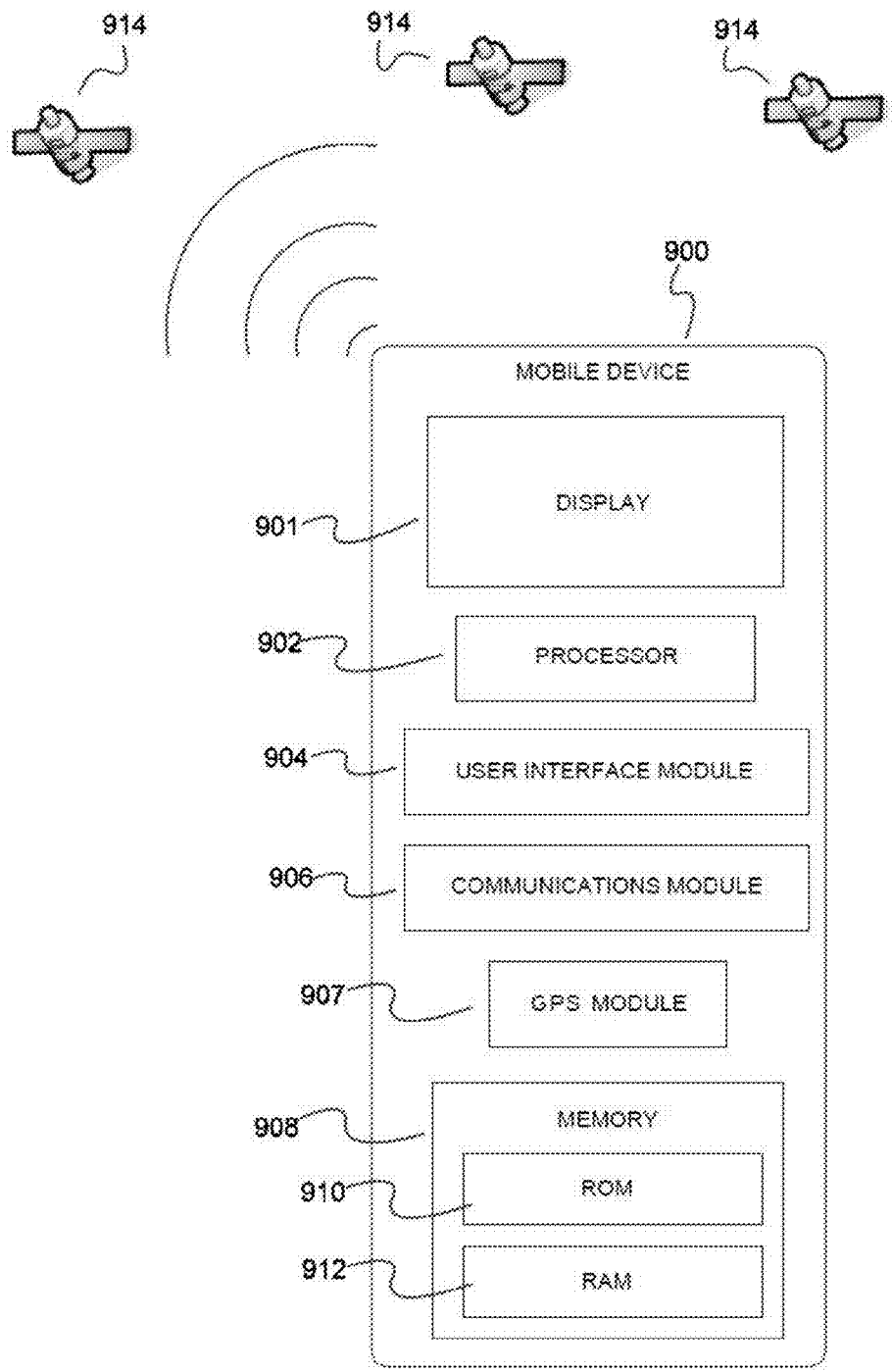
FIG. 9 depicts an exemplary illustration of a mobile device.

FIG. 9 is a block diagram illustrating the basic components of an example mobile device 900 which may be employed with systems and methods of this invention. As shown, the mobile device 900 includes a display 901, a processor 902, a user interface module 904, a communications module 906, and memory 908, including ROM 910 and RAM 912.

The processor 902 may include any hardware and/or software necessary for operating and/or controlling the user interface 904, the wireless communications module 906, and the memory 908. For example, the processor 902 may be individual digital logic components, a processor, a microprocessor, an application-specific integrated circuit (ASIC), and the like. The processor 902 may have its own memory such as random access memory (RAM), register memory, cache memory, and the like.

The processor 902 may be in communication with and/or in control of the user interface 904, the wireless communications module 906, and/or the memory 908. For example, the processor 902 may direct the user interface 904 to receive input from the user or present content on display 901, transmit or receive data via the wireless communications module 906, or retrieve preferences from a user profile stored in the memory 908.

The processor 902 may operate on computer-executable instructions. Computer-executable instructions may include computer-readable instructions, for example machine code, byte code, script language, runtime code, and the like. The computer-executable instructions for example, when executed by the processor 902, may cause the processing component to perform the methods described in FIGS. 1 and 4-7.

The user interface 904 may be, in any combination of hardware and/or software, any component, system and/or subsystem for receiving input from a user and/or outputting information to the user. The user interface 904 may include display 901, a number pad, or a keyboard. For example, the user interface 904 may include a telephone keypad, programmable softkeys, mechanical buttons, touch screens, and the like. One or more display screens 901 may provide visual output, for example the display of content pertinent to systems and methods of this invention. The user interface 904 may include a speaker for audio output and/or a microphone for audio input.

The wireless communications module 906 may be, in any combination of hardware and/or software, any component, system, and/or subsystem for providing wireless communications to or from the mobile device. The wireless communications module 906 may provide a wireless communications channel between wireless devices. The wireless communications module 906 may provide point-to-point wireless communications between mobile device 900 and a peer device. For example, the wireless communications module 906 may communicate in accordance various commercially available BLUETOOTH® protocols, and the like.

Wireless communications module 906 may provide radio frequency (RF) communications between mobile device 900 and other fixed and wireless devices, for example computing device 302, mobile device 303, smart phones 304, as well as other cell phones, laptops, PDAs, and other commercially available communications devices. Wireless communications module 906 may provide a wireless communications channel between mobile device 900 and a wireless communications network. Wireless communications module 906 may provide cellular communications or wireless data network communications, for example Wi-Fi (IEEE 802.11), WiMAX (IEEE 802.16), and the like.

Memory 908 may be any component, system, and/or subsystem suitable for storing data. For example, memory 908 may include storage media in the form of volatile and/or nonvolatile memory such as read only memory (ROM) 910 and random access memory (RAM) 912. A basic input/output system (BIOS), containing basic routines that help to transfer information between components within mobile device 900, such as during start-up, is typically stored in ROM 910. RAM 912 typically contains data and/or application modules that are immediately accessible to and/or presently being operated on by processor 902.

Mobile device 900 may also include other removable/non-removable, volatile/nonvolatile storage media that can be used as part of memory 908, for example hard disk drives, optical disc drives, flash memory cards, and the like. The storage media discussed above provide for storage of computer-readable instructions, data structures, program modules and other data for the mobile device 900, which may be executed on processor 902.

A GPS module 907 may be integrated as the location based service 380 in accordance with the present invention. Together with various satellites 914, the GPS module 907 is capable of determining the current location of the mobile device 900. Three GPS satellites 914, of the total of twentyfour GPS satellites 914 that circumnavigate the globe, are shown to transmit power radio signals at a predetermined frequency in the UHF band. The GPS signal contains three different pieces of information, i.e., a pseudo-random code, ephemeris data, and almanac data. The pseudo-random code identifies the transmitting satellite 914; the ephemeris data tells a GPS receiver where the GPS satellite 914 should be at any time throughout the day; and the almanac data, which is constantly transmitted by each satellite 914, contains important information about the status of the satellite, i.e., healthy or unhealthy, and current date and time.

A GPS receiver within the GPS module 907 uses an internal antenna to capture GPS signals sent by the three GPS satellites 914. The GPS module 907 calculates pseudo ranges from the satellites 914 to its own position within the mobile device 900. By receiving the GPS signals from the GPS satellites 914, the GPS module 907 is able to compare the time each received signal was transmitted by the satellites 914 with the time the signal was received. The GPS module 914 may use this comparison information to calculate degrees longitude and latitude and to triangulate the position of the mobile device 900. Although not shown in FIG. 9, the mobile device 900 also contains an antenna for transmitting and receiving wireless communications. The location of the mobile device 900 could also be determined through use of cell tower triangulation through receipt and transmission of wireless signals from one or more cell towers, transmitters, and/or wireless devices.

It will be readily apparent that the various methods and algorithms described herein may be implemented in a computer readable medium appropriately programmed for general purpose computers and computing devices. Typically a processor, for e.g., one or more microprocessors will receive instructions from a memory or like device, and execute those instructions, thereby performing one or more processes defined by those instructions. Further, programs that implement such methods and algorithms may be stored and transmitted using a variety of media, for e.g., computer readable media in a number of manners. In one embodiment, hardwired circuitry or custom hardware may be used in place of, or in combination with, software instructions for implementation of the processes of various embodiments. Thus, embodiments are not limited to any specific combination of hardware and software. A 'processor' means any one or more microprocessors, Central Processing Unit (CPU) devices, computing devices, microcontrollers, digital signal processors or like devices. The term 'computer-readable medium' refers to any medium that participates in providing data, for example instructions that may be read by a computer, a processor or a like device. Such a medium may take many forms, including but not limited to, non-volatile media, volatile media, and transmission media. Non-volatile media include, for example, optical or magnetic disks and other persistent memory volatile media include Dynamic Random Access Memory (DRAM), which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during Radio Frequency (RF) and Infrared (IR) data communications. Common forms of computer-readable media include, for example, a floppy disk, a flexible disk, hard disk, magnetic tape, any other magnetic medium, a Compact Disc-Read Only Memory (CD-ROM), Digital Versatile Disc (DVD), any other optical medium, punch cards, paper tape, any other physical medium with patterns of holes, a Random Access Memory (RAM), a Programmable Read Only Memory (PROM), an Erasable Programmable Read Only Memory (EPROM), an Electrically Erasable Programmable Read Only Memory (EEPROM), a flash memory, any other memory chip or cartridge, a carrier wave as described hereinafter, or any other medium from which a computer can read. In general, the computer-readable programs may be implemented in any programming language. Some examples of languages that can be used include C, C++, C#, .NET or JAVA. The software programs may be stored on or in one or more mediums as an object code. A computer program product comprising computer executable instructions embodied in a computer-readable medium comprises computer parsable codes for the implementation of the processes of various embodiments.

The mobile devices of the requestor 201 and the recipient 203 may support Java of Sun Microsystems Inc., more specifically Java 2 Micro Edition (J2ME™), Windows Mobile .Net Compact Framework of Microsoft Inc., Palm, Symbian™, Linux framework. Exemplarily, the mobile client 202a may be implemented on the J2ME platform. These environments provide functionalities in the libraries to create the user interface of the mobile client 202a and perform all the required functions of the method and system disclosed herein. Other advantages of these frameworks are portability across mobile devices that run on different operating systems. The mobile client 202a may be rendered independent of the operating system of the mobile device. Some of the mobile phones equipped with both wireless network and telephony data capabilities may use either of the two to communicate with the information exchange server 206. The transport protocol that is used between the mobile client 202a and the information exchange server 206 may be hypertext transfer protocol (HTTP), Secure Sockets Layer (SSL), or extensible markup language-remote procedure calls (XML-RPC).

Where databases are described such as the information database 206a, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats including relational databases, object-based models and/or distributed databases could be used to store and manipulate the data types described herein. Likewise, object methods or behaviors of a database can be used to implement various processes, such as the described herein. In addition, the databases may, in a known manner, be stored locally or remotely from a device that accesses data in such a database.

The present invention can be configured to work in a network environment including a computer that is in communication, via a communications network, with one or more devices. The computer may communicate with the devices directly or indirectly, via a wired or wireless medium such as the Internet, Local Area Network (LAN), Wide Area Network (WAN) or Ethernet, Token Ring, or via any appropriate communications means or combination of communications means. Each of the devices may comprise computers, such as those based on the Intel® processors, AMD® processors, UltraSPARC® processors, etc. that are adapted to communicate with the computer. Any number and type of machines may be in communication with the computer.

The foregoing examples have been provided merely for the purpose of explanation and are in no way to be construed as limiting of the present method and system disclosed herein. While the invention has been described with reference to various embodiments, it is understood that the words, which have been used herein, are words of description and illustration, rather than words of limitation. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may affect numerous modifications thereto and changes may be made without departing from the scope and spirit of the invention in its aspects.

I claim:

1. A system for updating contact information on a mobile device, comprising:
   at least one processor;
   a database for storing a plurality of contact records with contact data; wherein at least one contact record in the plurality of contact records is associated with a plurality of mobile devices having a corresponding contact record; and
   a computer-readable storage medium storing one or more sequences of instructions which, when read by the at least one processor, causes the system to:
      receive new contact data for one of the plurality of contact records;
      update the contact record of the one of the plurality of contact records in the database;
      identify the mobile devices within the plurality of mobile devices within the database having both the corresponding contact record and a mobile device type capable of receiving a push transmission;
      identify a message type associated with each of the identified mobile devices; and
      initiate the push transmission to the mobile devices with the corresponding contact record using the identified message type.

2. The system of claim 1, wherein the transmission includes the new contact data to update the contact record on the mobile device.

3. The system of claim 1, wherein the transmission includes a notification of new contact data.

4. The system of claim 3, wherein the notification is sent to a mobile client on the mobile device.

5. The system of claim 4, wherein the new contact data is retrieved from the at least one processor by the mobile client.

6. The system of claim 1, wherein the push transmission is the system detecting a change in the one contact record in the database.

7. The system of claim 1, wherein the push transmission is initiated at scheduled to be sent at intervals.

8. The system of claim 7, wherein the interval is one of either a daily interval, a weekly interval, and a monthly interval.

9. A processor-implemented method for updating contact information on a mobile device, comprising:
   receiving, by at least one processor based device, at least one piece of new contact data associated with one of a plurality of contact records stored in a database in communication with the processor based device; wherein the one contact record in the plurality of contact records is associated with a plurality of mobile devices having a corresponding contact record;
   updating the one of a plurality contact records in the database with the at least one piece of new contact data;
   identifying the mobile devices within the plurality of mobile devices within the database having both the corresponding contact record and a mobile device type capable of receiving a push transmission;
   identifying a message type associated with each of the identified mobile devices; and
   initiating, by the at least one processor based device, the push transmission to the plurality of identified mobile devices with the corresponding contact record using the identified message type.

10. The method of claim 9, further comprising the step of including the new contact data into the push transmission to update the contact record on the mobile device.

11. The method of claim 9, wherein the transmission includes a notification of new contact data.

12. The method of claim 11, wherein the notification is sent to a mobile client on the mobile device.

13. The method of claim 12, further comprising the step of retrieving the new contact data by the mobile client.

14. The method of claim 9, wherein the push transmission is initiated upon the system detecting a change in the one contact record in the database.

15. The method of claim 9, wherein the push transmission is initiated at scheduled intervals.

16. The method of claim 15, wherein the interval is one of either a daily interval, a weekly interval, and a monthly interval.

17. A computer program product comprising a non-transitory computer readable medium, for use by a computer system, operable to cause the computer system to perform operations comprising:
   receiving at least one piece of new contact data associated with one of a plurality of contact records stored in a database in communication with the computer system; wherein the one contact record in the plurality of contact records is associated a plurality of mobile devices having a corresponding contact record;
   updating the one of a plurality of contact records in the database with the at least one piece of new contact data;
   identifying the mobile devices within the plurality of mobile devices within the database having both the corresponding contact record and a mobile device type capable of receiving a push transmission;
   identifying a message type associated with each of the identified mobile devices; and
   initiating, by the computer system, the push transmission to the plurality of identified mobile devices with the corresponding contact record using the identified message type.

18. The product of claim 17, wherein the transmission includes the new contact data to update the contact record on the mobile device.

19. The product of claim 17, wherein the transmission includes a notification of new contact data.

20. The product of claim 19, wherein the notification is sent to a mobile client on the mobile device.

21. The product of claim 20, wherein the new contact data is retrieved from the computer system by the mobile client.

22. The product of claim 17, wherein the push transmission is initiated upon the system detecting a change in the one contact record in the database.

23. The product of claim 17, wherein the push transmission is initiated at scheduled intervals.

24. The product of claim 23, wherein the interval is one of either a daily interval, a weekly interval, and a monthly interval.

25. A system for updating contact information on a mobile device, comprising:
   at least one processor;
   a database for storing a plurality of contact records with contact data; wherein at least one contact record in the plurality of contact records is associated with a plurality of mobile devices having a corresponding contact record; and
   a computer-readable storage medium storing one or more sequences of instructions which, when read by the at least one processor, causes the system to:
   receive new contact data for one of the plurality of contact records;
   update the contact record of the one of the plurality of contact records in the database;
   identify the mobile devices within the plurality of mobile devices within the database having both the corresponding contact record and a mobile device type capable of receiving a push transmission which includes the new contact information embedded within the push transmission;
   identify a message type associated with each of the identified mobile devices; and
   initiate the push transmission which includes the new contact information embedded within the transmission to the identified mobile devices using the identified message type.

26. The system of claim 25, wherein the push transmission is initiated upon the system detecting a change in the one contact record in the database.

27. The system of claim 25, wherein the push transmission is scheduled to be sent at intervals.

28. The system of claim 27, wherein the interval is one of either a daily interval, a weekly interval, or a monthly interval.

* * * * *